(12) United States Patent
Yoshizawa et al.

(10) Patent No.: US 6,497,213 B2
(45) Date of Patent: Dec. 24, 2002

(54) CONTROLLED AUTO-IGNITION LEAN BURN STRATIFIED ENGINE BY INTELLIGENT INJECTION

(75) Inventors: Koudai Yoshizawa, Kanagawa (JP); Atushi Teraji, Yokohama (JP); Ken Naitoh, Yamagata (JP)

(73) Assignee: Nissan Motor Co., Ltd., Yokohama (JP)

( * ) Notice: Subject to any disclaimer, the term of this patent is extended or adjusted under 35 U.S.C. 154(b) by 40 days.

(21) Appl. No.: 09/853,702

(22) Filed: May 14, 2001

(65) Prior Publication Data

US 2001/0045201 A1 Nov. 29, 2001

(30) Foreign Application Priority Data

May 16, 2000 (JP) .......................... 2000-143860

(51) Int. Cl.⁷ .................................. F02B 3/10
(52) U.S. Cl. .................. 123/299; 123/430; 123/295
(58) Field of Search ................... 113/299, 295, 113/568.14, 430

(56) References Cited

U.S. PATENT DOCUMENTS

| | | | | |
|---|---|---|---|---|
| 4,193,382 A | * | 3/1980 | Oshima | 123/259 |
| 4,414,940 A | * | 11/1983 | Loyd | 123/275 |
| 5,535,716 A | | 7/1996 | Sato et al. | 123/279 |
| 5,918,577 A | * | 7/1999 | Martelli et al. | 123/295 |
| 6,135,088 A | * | 10/2000 | Duret | 123/430 |
| 6,202,624 B1 | * | 3/2001 | Stuerz et al. | 123/295 |
| 6,321,715 B1 | * | 11/2001 | Dong | 123/295 |
| 6,386,177 B2 | * | 5/2002 | Urushihara et al. | 123/299 |
| 6,390,057 B2 | * | 5/2002 | Yoshizawa et al. | 123/295 |
| 6,401,688 B2 | * | 6/2002 | Teraji et al. | 123/295 |

FOREIGN PATENT DOCUMENTS

| | | |
|---|---|---|
| JP | 7-332141 | 12/1995 |
| JP | 10-266878 | 10/1998 |
| JP | 11-182246 | 7/1999 |
| JP | 11-294125 | 10/1999 |
| JP | 2000-73797 | 3/2000 |

OTHER PUBLICATIONS

U.S. application Ser. No. 09/734,890, Koudai Yoshizawa et al., filed Dec. 13, 2000.
U.S. application Ser. No. 09/767,025, Tomonori Urushihara et al., filed Jan. 23, 2001.
U.S. application Ser. No. 09/813,892, Koji Hiraya et al., filed Mar. 22, 2001.

* cited by examiner

*Primary Examiner*—Erick Solis
(74) *Attorney, Agent, or Firm*—Foley & Lardner

(57) ABSTRACT

A system and method for widening auto-ignition range of a lean burn internal combustion engine employs stratified charge of exhaust gas content and air content. A fuel injection system carries out a first injection of gasoline fuel for dispersion within the air content, and a second injection of gasoline fuel for dispersion within the exhaust gas content. This intelligent injection of gasoline fuel accomplishes auto-ignition of gasoline fuel within the exhaust gas content over extended range of engine speed and load.

17 Claims, 25 Drawing Sheets

EXHAUST GAS

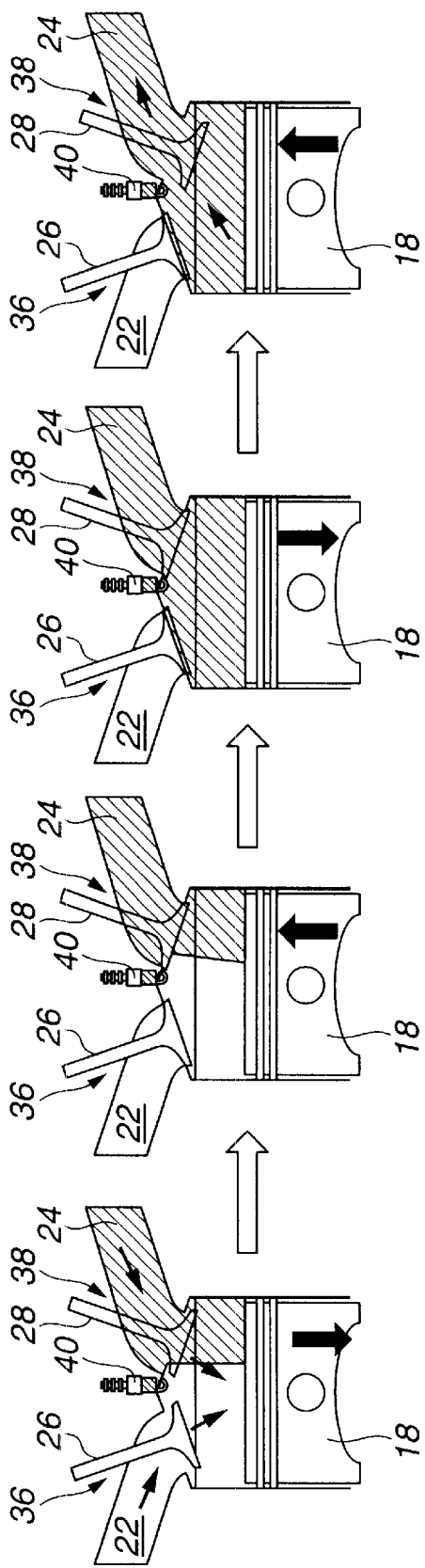

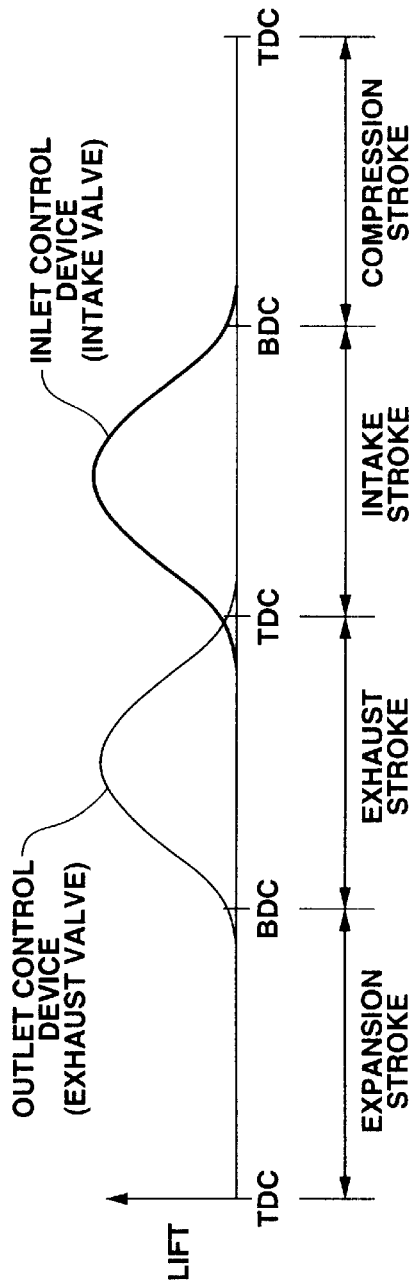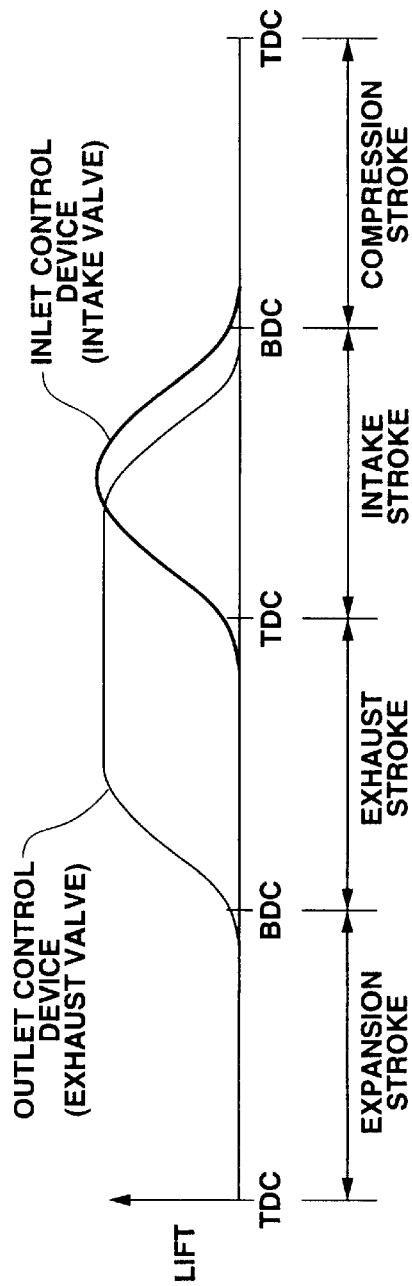

CONTROLLED AUTO-IGNITION LEAN BURN STRATIFIED ENGINE BY INTELLIGENT INJECTION

BACKGROUND OF THE INVENTION

1. Field of the Invention

The present invention relates to a lean burn internal combustion engine.

2. Description of Related Art

To improve thermal efficiency of gasoline internal combustion engines, lean burn is known to give enhanced thermal efficiency by reducing pumping losses and increasing ratio of specific heats. Flatly speaking, lean burn is known to give low fuel consumption and low NOx emissions. There is however a limit at which an engine can be operated with a lean air/fuel mixture because of misfire and combustion instability as a result of a slow burning. Known methods to extend the lean limit include improving ignitability of the mixture by enhancing the fuel preparation, for example using atomized fuel or vaporized fuel, and increasing the flame speed by introducing charge motion and turbulence in the air/fuel mixture. Finally, combustion by auto-ignition has been proposed for operating an engine with very lean air/fuel mixtures.

When certain conditions are met within a homogeneous charge of lean air/fuel mixture during low load operation, auto-ignition can occur wherein bulk combustion takes place initiated simultaneously from many ignition sites within the charge, resulting in very stable power output, very clean combustion and high thermal efficiency. NOx emission produced in controlled auto-ignition combustion is extremely low in comparison with spark ignition combustion based on propagating flame front and heterogeneous charge compression ignition combustion based on an attached diffusion flame. In the latter two cases represented by spark ignition engine and diesel engine, respectively, the burnt gas temperature is highly heterogeneous within the charge with very high local temperature values creating high NOx emission. By contrast, in controlled auto-ignition combustion where the combustion is uniformly distributed throughout the charge from many ignition sites, the burnt gas temperature is substantially homogeneous with much lower local temperature values resulting in very low NOx emission.

Engines operating under controlled auto-ignition combustion have already been successfully demonstrated in two-stroke gasoline engines using a conventional compression ratio. It is believed that the high proportion of burnt gases remaining from the previous cycle, i.e., the residual content, within the two-stroke engine combustion chamber is responsible for providing the hot charge temperature and active fuel radicals necessary to promote auto-ignition in a very lean air/fuel mixture. In four-stroke engines, because the residual content is low, auto-ignition is more difficult to achieve, but can be induced by heating the intake air to a high temperature or by significantly increasing the compression ratio.

In all the above cases, the range of engine speeds and loads in which controlled auto-ignition combustion can be achieved is relatively narrow. The fuel used also has a significant effect on the operating range, for example, diesel fuel and methanol fuel have wider auto-ignition ranges than gasoline fuel.

An auto-ignition, which is induced by heating fuel and significantly increasing the compression ratio, in four-stroke gasoline engine is described in U.S. Pat. No. 5,535,716, which claims priority of Japanese patent application No. 6-150487 that was laid open as JP-A 7-332141 on Dec. 22, 1995. Gasoline fuel is injected inside the intake port a considerable amount of time before the intake valve is open so that the mixture of air and gasoline in the intake port is sufficiently heated before entering the combustion chamber. The mixture is ignited by compression ignition performed at high pressure. Since the gasoline fuel injected in the intake port is completely evaporated before entering the combustion chamber, reliable compression ignition is achieved. The compression ratio ranges from about 14 to about 20. Use of a compression ratio of 17.7 is described as the most preferred implementation in this publication.

Injection of the gasoline fuel is performed during a lo predetermined period from 10 degrees of crankshaft angle before the intake valve is closed to 110 degrees of crankshaft angle before the intake valve is opened.

JP-A 10-266878 discloses a technique to accomplish auto-ignition of gasoline fuel over a predetermined load range from light load to high load by adjusting closing timing of an exhaust valve as well as opening and closing timings of an intake valve. According to this known technique, over the predetermined load range, an opening timing of the exhaust valve is held invariable at a crank position before a bottom dead center (BDC) position of expansion stroke against variations of load request, but a closing timing of the exhaust valve is adjusted to varying crank positions before a top dead center (TDC) position of exhaust stroke against varying load request. A throttle valve is fully opened over this predetermined load range. The closing timing of the exhaust valve advances as load request becomes low to increase the amount of exhaust gas remaining in a cylinder to decrease the amount of fresh charge. In order to retain exhaust gas, the opening timing of the intake valve is adjusted to varying crank positions after the TbC position of exhaust stroke against varying load request over the predetermined load range. The opening timing of the intake valve retards as load request becomes low. The closing timing of the intake valve is adjusted to varying crank positions after a bottom dead center (BDC) position of intake stroke against varying load request over the predetermined load range. The closing timing of the intake valve retards gradually as load request becomes high over a portion of the predetermined load range and then advances gradually as load request becomes high over the remaining portion of the predetermined load range. According to this known technique, closing timing of the exhaust valve controls the amount of exhaust gas in the cylinder, thereby controlling available combustion chamber volume for receiving fuel mixture thereby controlling load. Further, closing timing of the intake valve advances during operation with load where auto-ignition is difficult to accomplish. Advancing closing timing of intake valve increases a compression ratio thereby increasing temperature of the mixture in the cylinder.

U.S. Pat. No. 6,135,088, which corresponds to JP-A 11-182246, shows a controlled auto-ignition engine operating process. According to this process, exhaust gas recirculated from an exhaust port through an EGR pipe is admitted to the combustion chamber, and thereafter a mixture of air and fuel is admitted through an intake port into the combustion chamber at a start of compression phase of the combustion chamber. Admission of the air fuel mixture produces stratification between the mixture and the exhaust gas to provide favorable conditions for auto-ignition within the combustion chamber.

According to this known process, the exhaust gas is used to elevate the temperature of the air and fuel mixture admitted into the combustion chamber to assist in establishing favorable condition for auto-ignition around top dead center of piston compression stroke.

SUMMARY OF THE INVENTION

An object of the present invention is to widen auto-ignition range of a lean burn internal combustion engine.

In one aspect of the present invention, the above object is achieved by a lean burn internal combustion engine having at least one cylinder with a piston reciprocating therein to define a combustion chamber. The engine comprises:

a first device for supplying first oxygen containing gas to the combustion chamber;

a second device for supplying second oxygen containing gas to the combustion chamber for producing stratification, within the combustion chamber, of first gas content with second gas content, the first gas being higher in temperature than the second gas; and a fuel injection system for carrying out a first injection of gasoline fuel into the combustion chamber for dispersion within the second gas content, and for carrying out a second injection of gasoline fuel into the combustion chamber for dispersion within the first gas content, thereby to accomplish auto-ignition of gasoline fuel within the first gas content of the combustion chamber.

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

FIGS. 29A, 29B, 29C and 29D illustrate intake, compression, expansion, and exhaust strokes of one cycle operation according to still further embodiment of the present invention.

FIG. 30 is a valve lift diagram for spark-ignition combustion mode.

FIG. 31 is a valve lift diagram for auto-ignition combustion mode.

BEST MODES FOR CARRYING OUT THE INVENTION

Figure 1:
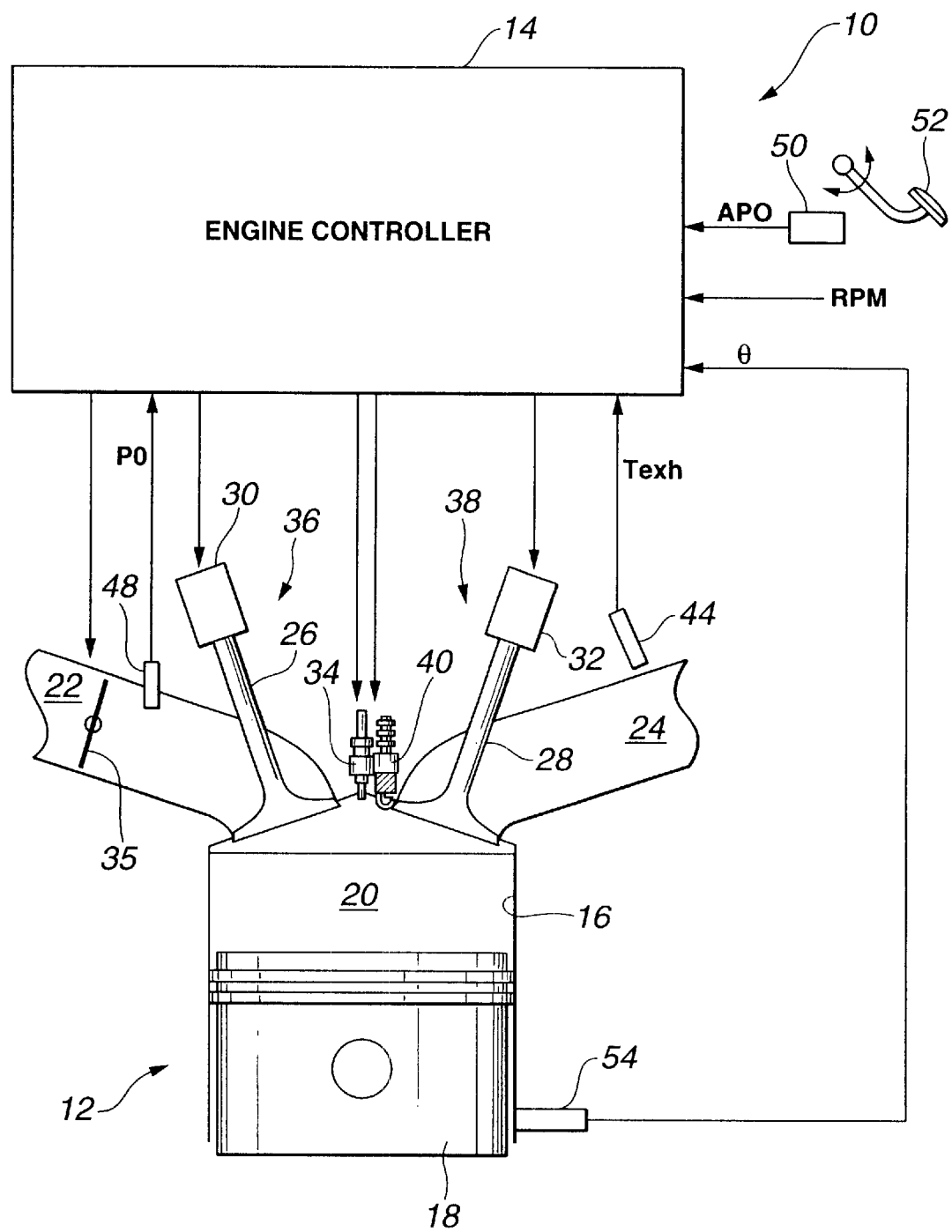
FIG. 1 is a block diagram illustrating a lean burn internal combustion engine, a system and method for widening auto-ignition range of a lean burn internal combustion engine according to the present invention.

FIG. 1 provides a block diagram of a system or method for widening auto-ignition range of a lean burn internal combustion engine. System 10 includes an internal combustion engine, indicated generally by reference numeral 12, in communication with an engine controller 14.

In FIG. 1, the area of a combustion chamber of engine 12 is shown. Engine 12 has at least one cylinder 16 with a piston 18 reciprocating therein to define a combustion chamber 20. Combustion chamber 20 is shown communicating within intake manifold 22 and exhaust manifold 24 via intake and exhaust valves 26 and 28, which are actuated by variable valve controllers 30 and 32. Fuel injector 34 of a fuel injection system is shown directly communicating with the combustion chamber 20 for direct injection of gasoline fuel into combustion chamber 20. A throttle 35 is used to throttle air for spark ignition combustion mode, but it is fully opened for auto-ignition combustion mode.

An inlet control device 36 controls flow into combustion chamber 20. An outlet control device 38 controls flow from combustion chamber 20. In a preferred embodiment, inlet control device 36 includes at least one intake valve 26 actuated by valve controller 30, and outlet control device 38 includes at least one exhaust valve 28 actuated by valve controller 32. However, as one skilled in the art would recognize, there are many alternative embodiments.

In cases where engine 12 operates on spark ignition combustion, particular control timing is transmitted to spark plug 40. In cases where engine 12 operates on auto-ignition combustion, no such control timing is transmitted to spark plug 40.

Various sensors are provided to assist in accomplishing auto-ignition at appropriate ignition point over wide range of engine speed and load. Various sensors may include an intake air pressure sensor 48, which provides a signal indicative of intake air pressure (P0) in one embodiment. In another embodiment, an exhaust gas temperature sensor 44 is used to determine a burnt or exhaust gas rate, that is a ratio of burnt or exhaust gas content of combustion chamber 20 to total of burnt or exhaust gas content and air content. Exhaust gas temperature sensor 44 provides a signal indicative of exhaust gas from combustion chamber 20.

Engine 12 may include various other sensors such as an engine speed sensor to provide a signal indicative of engine speed (RPM), a crank angle sensor 54 to provide a signal indicative of crank angle (θ), a pedal position sensor 50 to provide a signal indicative of the opening angle (APO) of an accelerator pedal 52, and the like. Accelerator pedal 52 is used to determine the driver demand, which, in turn, is used, as a load request, in the calculation of fuel quantity for injection.

Figure 2:
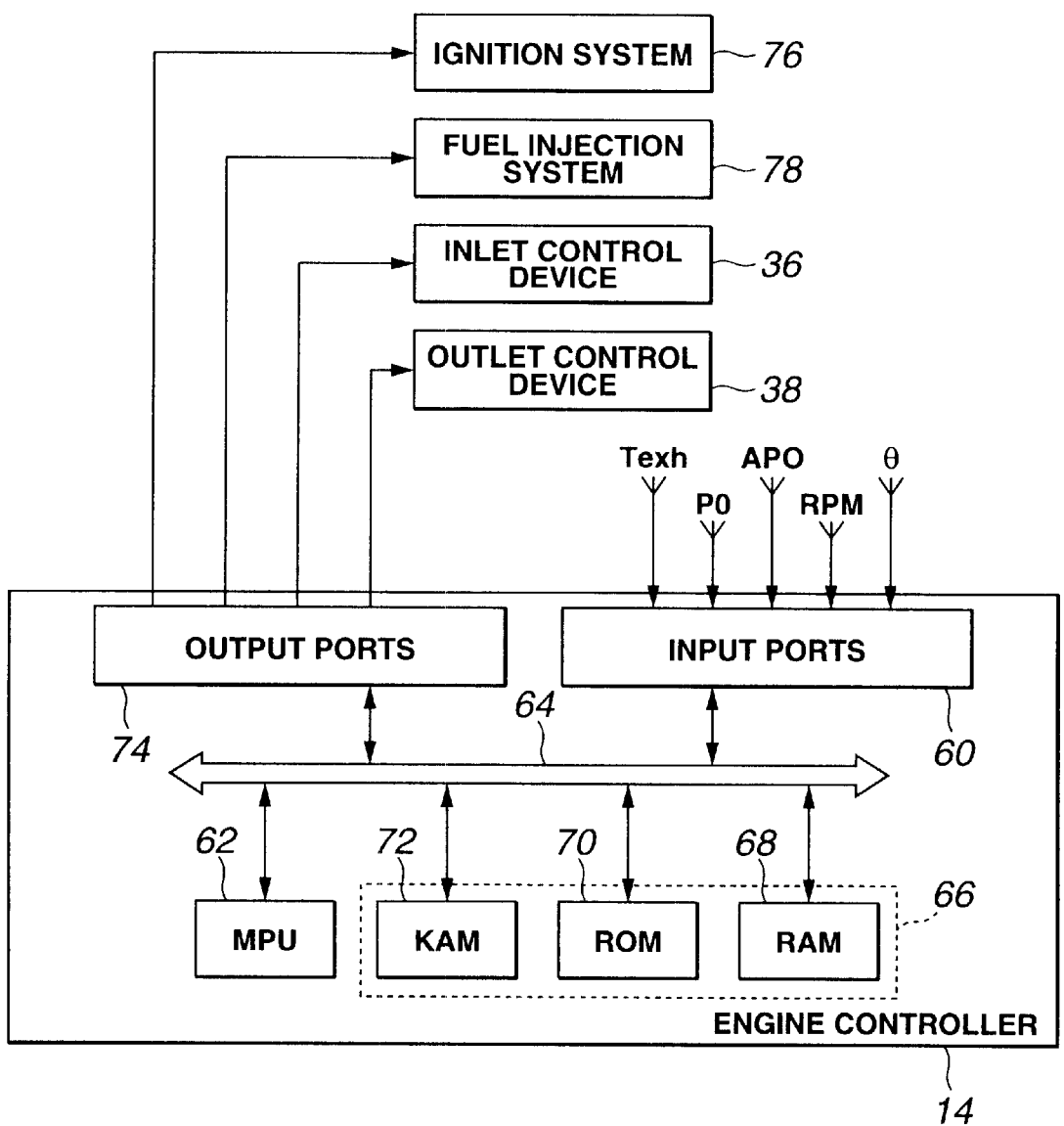
FIG. 2 is a block diagram illustrating engine controller according to the present invention.

Referring to FIG. 2, engine controller 14 receives signals from the various sensors via input ports 60, which may provide signal conditioning, conversion, and/or fault detection, as well known in the art. Input ports 60 communicate with processor 62 via a data/control bus 64. Processor 62 implements control logic in the form of hardware and/or software instructions, which may be stored in computer readable storage medium 66, to effect control of engine 12. Computer readable storage medium 66 may include various types of volatile or nonvolatile memory such as random-access memory (RAM) 68, read-only memory (ROM) 70, and keep-alive memory (KAM) 72. These "functional" classifications of memory may be implemented by one or more different physical devices such as PROMs, EPROMs, EEPROMs, flash memory, and the like, depending upon the particular application.

In one embodiment, processor 62 executes instructions stored in computer readable storage medium 66 to carry out the method for widening auto-ignition range of engine 12 to communicate with various actuators of engine 12 via output ports 74. Actuators may control ignition timing or spark 76, fuel injection timing and fuel quantity for injection 78, valve timing of inlet control device 36, and valve timing of outlet control device 38.

Characteristic engine diagrams for auto-ignition combustion mode and spark-ignition combustion mode are stored in controller 14 in the form of valve timings of inlet and outlet control devices 36 and 38 as well as for controlling the fuel injection for auto-ignition combustion and for controlling the fuel injection and ignition timing for spark-ignition combustion.

Figure 3:
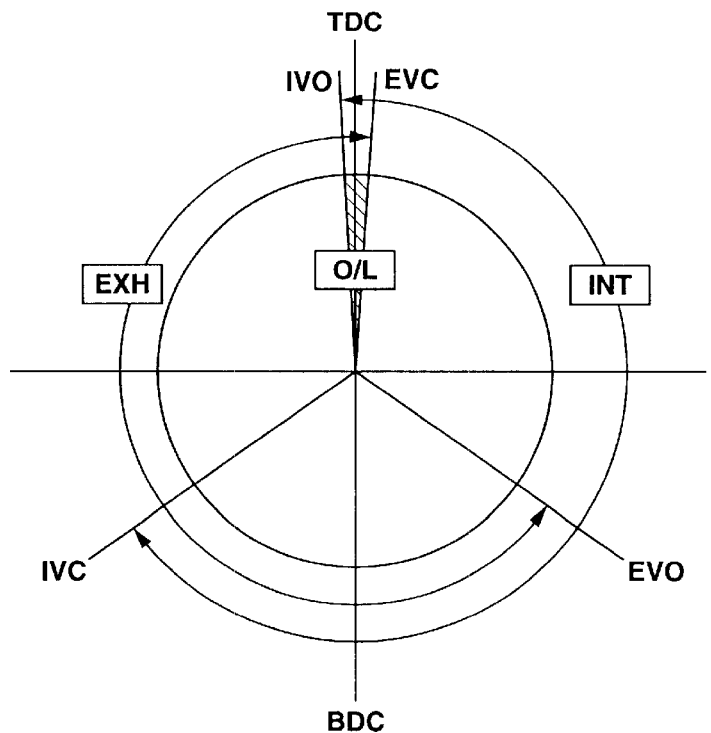
FIG. 3 is a valve timing diagram illustrating a representative example of valve timings of inlet and outlet control devices (intake and exhaust valves) for spark-ignition combustion mode.

FIG. 3 provides a valve timing diagram illustrating a representative example of valve timings of inlet and outlet control devices 36 and 38 (intake and exhaust valves 26 and 28) for spark-ignition combustion mode at full or near full load. In spark-ignition combustion mode, controller 14 transmits timings to outlet and inlet control devices 38 and 36 to provide optimum valve overlap duration around top dead center (TDC) of exhaust stroke of piston 18.

Figure 4:
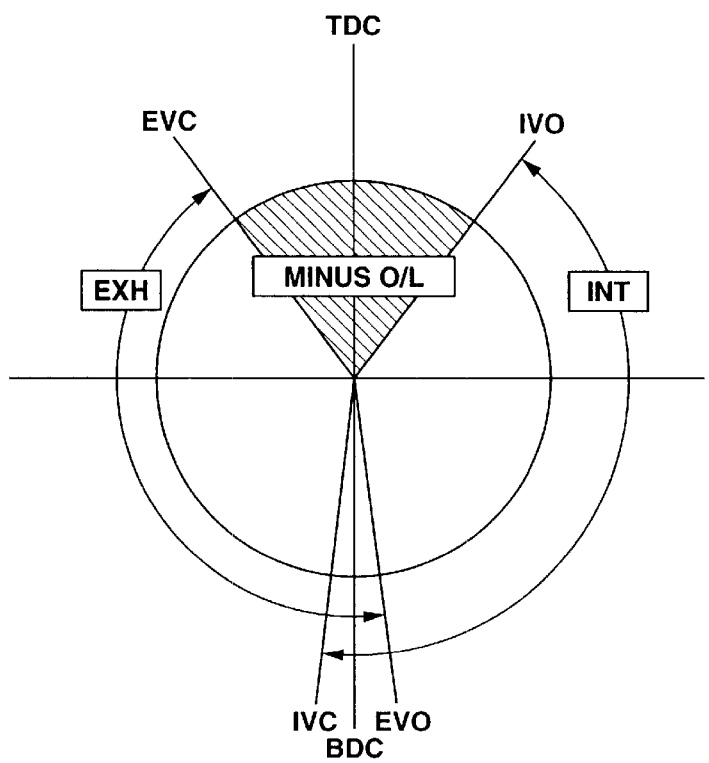
FIG. 4 provides a valve timing diagram illustrating valve timings of inlet and outlet control devices (intake and exhaust valves) for auto-ignition combustion mode..

FIG. 4 provides a valve timing diagram illustrating valve timings of inlet and outlet control devices 36 and 38 (intake and exhaust valves 26 and 28) for auto-ignition combustion mode. For providing environment of auto-ignition, exhaust valve 28 of outlet control device 38 is allowed to close before piston 18 reaches the TDC of the exhaust stroke, so that high temperature exhaust gas is retained and compressed in cylinder 16 during the last travel section of the piston exhaust stroke. Intake valve 26 of inlet control device 36 is opened after the TDC position of the exhaust stroke. Setting of opening timing is such that inlet control device 36 is allowed to open after almost all of work done by piston 18 to compress the retained gas has been transferred to energy to move piston 18 in downward direction from the TDC position. Exhaust gas is retained and compressed in cylinder 16 because both outlet and inlet control devices 38 and 36 are allowed to close. Compression of the retained exhaust gas causes an increase in cylinder temperature, which provides advantageous influence on auto-ignition at around top dead center (TDC) of the subsequent compression stroke. In each of FIGS. 3 and 4, various abbreviations are used. INT represents an intake valve, IVO represents intake valve opens, IVC represents intake valve closes, EXH represents an exhaust valve, EVO represents exhaust valve opens, and EVC represents exhaust valve closes. O/L represents an overlap between INT and EXH. Minus O/L represents a minus overlap when both EXH and INT close. Provision of such minus O/L around TDC of exhaust stroke is intended to retain exhaust.

For understanding of auto-ignition of gasoline fuel by retaining exhaust gas, reference should be made to the commonly assigned pending U.S. patent application Ser. No 09/767,025 filed Jan. 23, 2001, entitled "SYSTEM AND METHOD FOR AUTO-IGNITION OF GASOLINE INTERNAL COMBUSTION ENGINE", which is hereby incorporated by reference in its entirety.

Adjusting the rotational phase of a camshaft or a cam-driving shaft relative to a crankshaft of an engine is a well-known technique to vary opening and closing timings of a gas exchange valve. Examples of valve controllers employing such technique are shown in U.S. Pat. No. 5,669,343 (Adachi), U.S. Pat. No. 5836,276 (Iwasaki et al.), and JP-A P2000-73797A. Also known is a technique to adjust the rotational phase of a pivotal cam relative to a crankshaft of an engine. According to this known technique, the valve open duration and valve lift are varied. Examples of valve controllers employing this known technique are shown in U.S. Pat. No. 4,397,270 (Aoyama), Ronald J. Pierik and Burak A. Gecim "A Low-Friction Variable-Valve-Actuation Device, Part 1: Mechanism Description and Friction Measurements" SAE Paper 970338, 1997, U.S. Pat. No. 5,988,125 (Hara et al.), and JP-A 11-294125. It is also known to electromagentically operate a gas exchange valve. A valve controller employing this technique is shown in U.S. Pat. No. 5,785,016 (Enderle et al.).

Any one of the above listed valve controllers may be used in inlet and outlet control devices 36 and 38.

Figure 5:
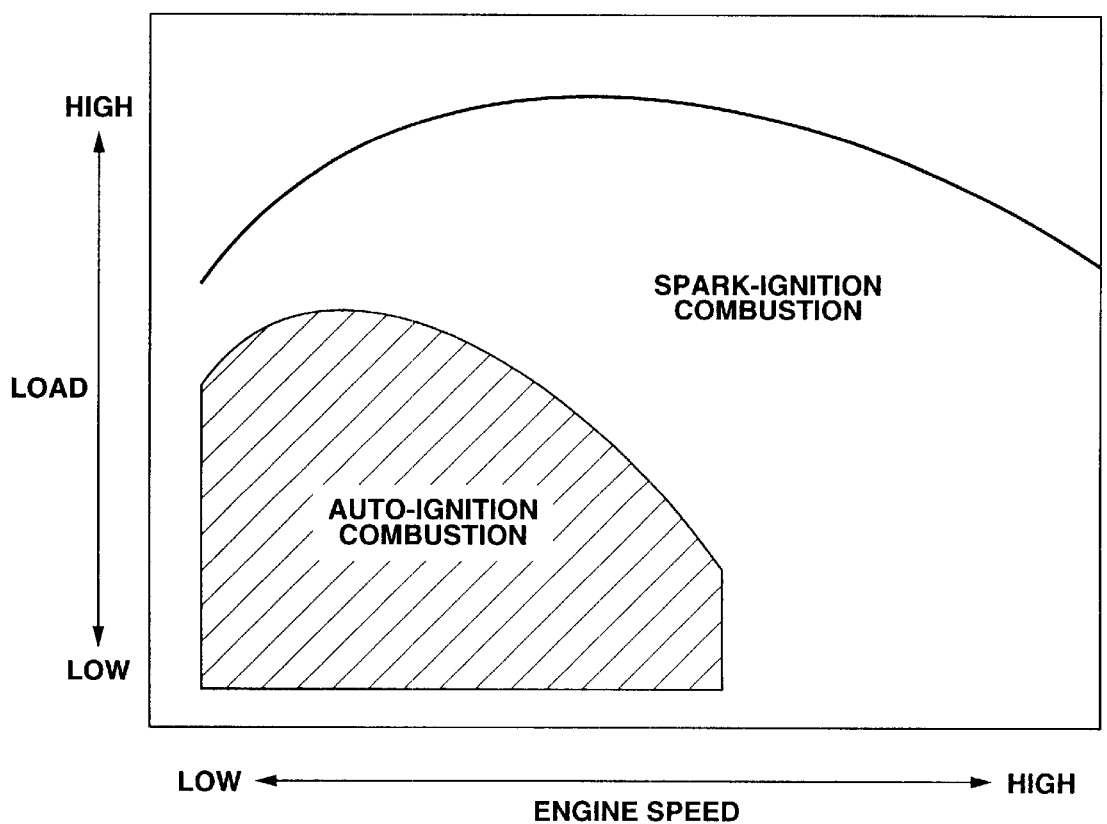
FIG. 5 is a range map illustrating widened auto-ignition range as well as spark-ignition range.

With reference to FIG. 5, auto-ignition range widened according to the present invention is indicated by shadowed area. In practical application, auto-ignition is carried out at low to middle engine speeds with low to middle load, while spark-ignition is carried out at high engine speeds or full load.

Figure 6:
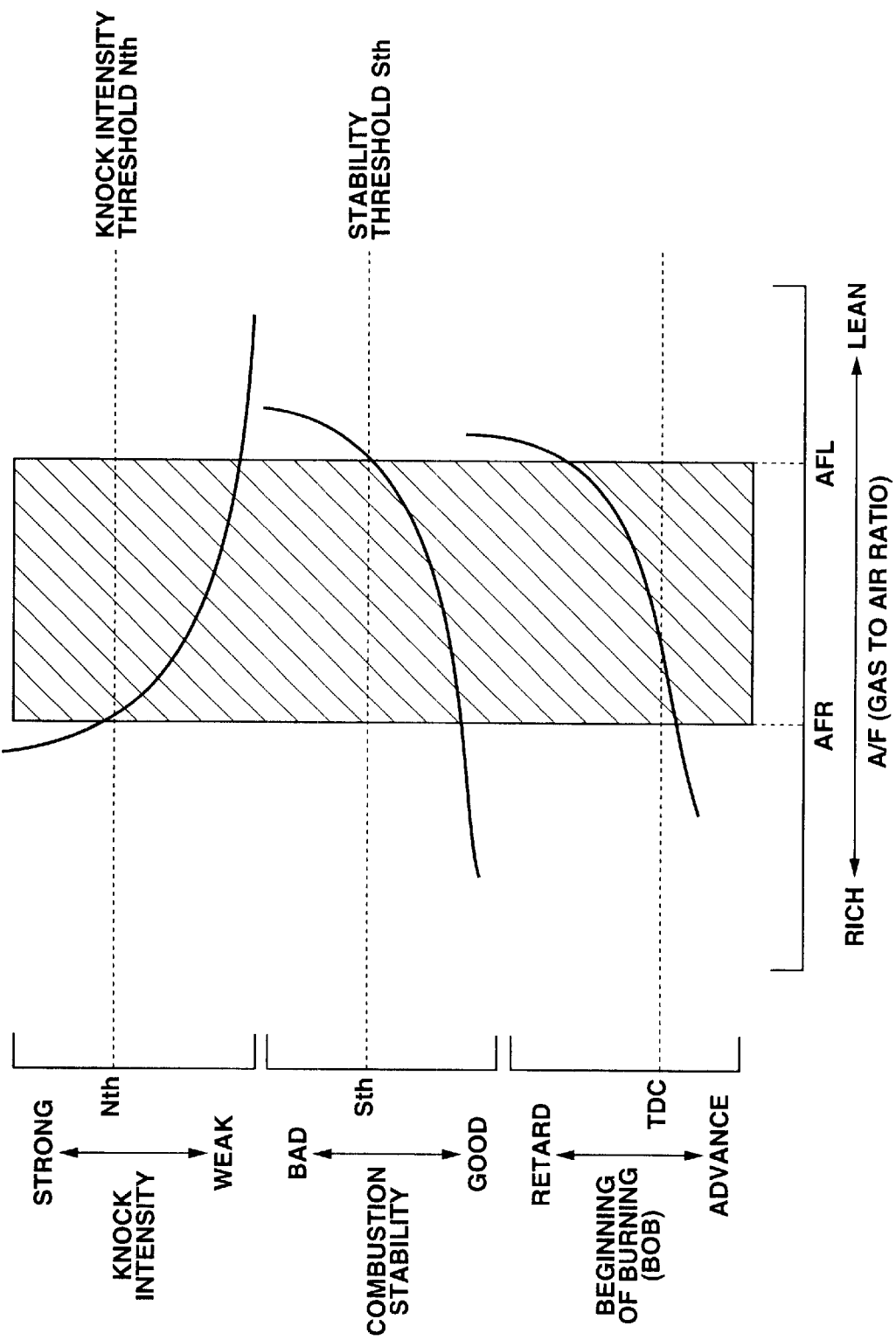
FIG. 6 is a graphical representation of auto-ignition combustion against various air/fuel ratio (A/F) or gas/fuel ratio (G/F).

With reference to FIG. 6, the shadowed area indicates an A/F range where stable controlled auto-ignition is recommended or allowed. Increasing A/F causes combustion stability to become worse and cyclic dispersion of engine torque to become great. There is a lower limit to levels of combustion stability. Such lower limit is determined after consideration of an allowable deviation from the designed values targeted by an engine and design target of a vehicle powered by the engine. A stability threshold Sth represents such lower limit. A/F reaches a lean limit AFL when combustion stability reaches stability threshold Sth.

Decreasing A/F causes knock intensity to become condensed or strong. When knock intensity reaches a knock intensity threshold Nth, A/F reaches a rich limit AFR. Thus, the rich and lean limits AFR and AFL define therebetween the A/F range where auto-ignition is allowed. In FIG. 6, the horizontal axis represents A/F because gas content of combustion chamber is air only. If the combustion chamber has burnt or EGR gas content as well as air content, the horizontal axis represents a ratio G/F, where G is the total of burnt or EGR gas content and air content. There is a G/F range, which allows auto-ignition in the same manner as the A/F range does.

The A/F or G/F ranges where auto-ignition is allowed are not wide enough. This derives from the fact that a variation of A/F or G/F causes a variation of beginning of burning (BOB) as shown in FIG. 6. BOB of auto-ignition depends on speed of pre-reaction of gasoline fuel, that is, low temperature oxidation reaction. This reaction speed is mainly governed by A/F. If A/F is reduced to obtain a rich mixture, the reaction speed increases. As a result, burning begins at an early crank position before TDC of compression stroke, causing such rapid burning as to induce knock. If A/F is increased to obtain a lean mixture, the reaction speed drops. As a result, burning begins at a late crank position after TDC of compression stroke. The subsequent descending movement of piston makes it difficult to complete the burning, causing combustion instability.

According to the present invention, BOB is controlled to widen auto-ignition range.

Figure 7:
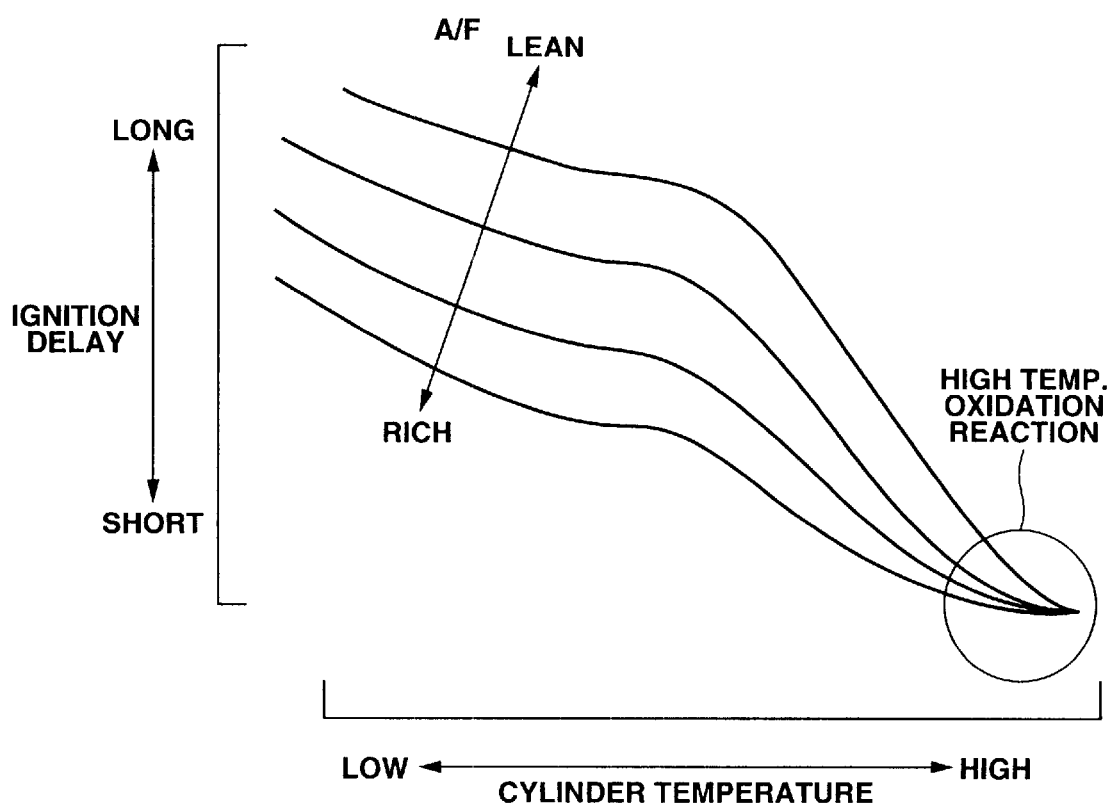
FIG. 7 is a graphical representation of variation of ignition delay against variation of cylinder temperature with A/F as a parameter.

FIG. 7 is a graphical representation of variation of ignition delay against variation of cylinder temperature with A/F as a parameter. Ignition delay is a delay between injection of fuel and beginning of burning of the injected fuel The ignition delay becomes short as cylinder temperature becomes high. With the same cylinder temperature, ignition delay becomes short as A/F becomes rich. There is a region in temperature where the ignition delay is extremely short. As indicated by a circle in FIG. 7, high temperature reaction occurs within this region. High temperature reaction of gasoline takes place at around 1000 K. Thus, an injection of gasoline fuel for dispersion within a gas having a temperature of 1000 K causes burning of the fuel to begin immediately after the injection.

Burning a great amount of gasoline fuel initiated by auto-ignition within high temperature gas causes a great increase in cylinder temperature, thereby to cause an increase of NOx. Thus, it is found that high temperature gas region within the combustion chamber is held within the required minimum volume and the fuel quantity for high temperature oxidation reaction is held at the required minimum value.

The present invention employs a technique to produce stratification, within a combustion chamber, of first gas content with second gas content. Both the first and second gases are oxygen-containing gases. The first gas is higher in temperature than the second gas. In one embodiment, the first gas is burnt (or exhaust) gas from the previous cycle, and the second gas is fresh air. The stratification proves to be effective to minimize a drop in temperature of the first gas due to interaction with the second gas during induction and compression strokes.

In one embodiment, the inlet and outlet control devices 36 and 38 are so adjusted as to retain exhaust gas from the previous cycle to provide valve timing as illustrated in FIG. 4. The inlet and outlet control devices 36 and 38 so adjusted as to retain exhaust gas serve as a first device for supplying, as the first gas, the retained exhaust gas to combustion chamber 20. Varying closing timing of the outlet control device 38 may vary the quantity of exhaust gas retained during exhaust gas retaining duration. For further information on how to vary exhaust gas retaining duration, reference should be made to the commonly assigned pending U.S. Patent Application Serial No. unassigned yet, entitled "AUTO-IGNITION OF GASOILINE ENGINE BY VARYING EXHAUST GAS RETAINING DURATION", WHICH CLAIMS PRIORITY OF Japanese Patent Application No. 2000-095500 filed Mar. 30, 2000.

Figure 8:
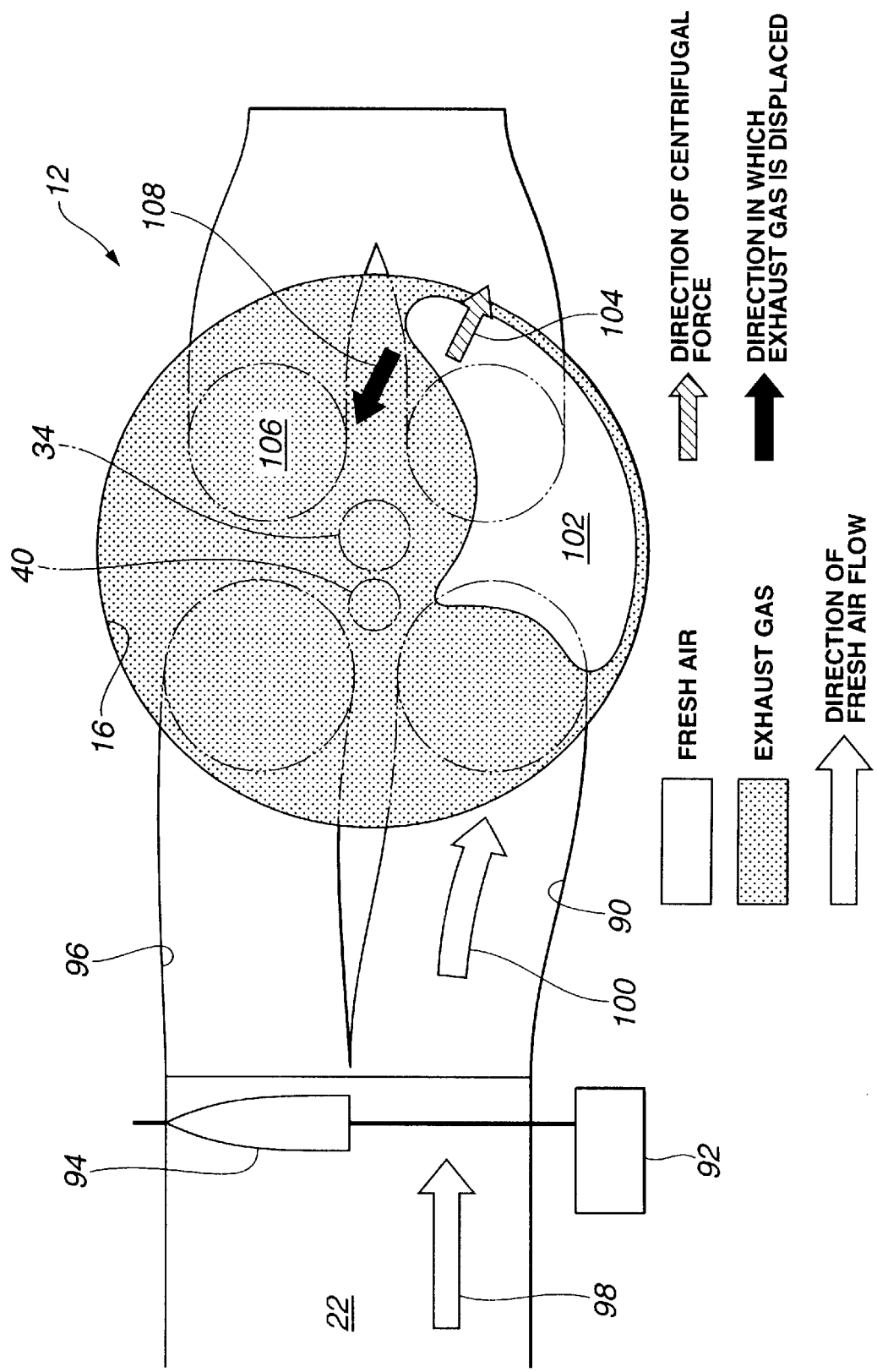
FIG. 8 is a diagram illustrating how to supply fresh air to a combustion chamber during intake stroke for producing stratification, within the combustion chamber, of the remaining burnt gas content with the fresh air content.

FIG. 8 provides a diagram illustrating how to supply fresh air to the combustion chamber within cylinder 16 during intake stroke. In one embodiment, fresh air is supplied to the combustion chamber within the cylinder 16 through an intake port 90 only when a valve actuator 92 activates a port valve 94 to close another intake port 96. Both of the intake ports 90 and 96 are coupled to cylinder 16 and opens to the combustion chamber when the associated Intake valves, not shown in FIG. 8, open. There is no flow of air through intake port 96 when port valve 94 closes. Under this condition, the fresh air from intake manifold 22 is drawn through intake port 90 into the lo combustion chamber within cylinder 16 as indicated by arrows 98 and 100. Intake port 90 is coupled to cylinder 16 to provide an arrangement whereby the fresh air 98 and 100 drawn through intake port 90 into the combustion chamber generates a swirl about the cylinder axis. Centrifugal force (see an arrow 104) causes air content 102 to rotate along the wall of cylinder 16, displacing exhaust gas content 106 inwardly (see arrow 108), thereby producing stratification of exhaust gas content 106 with fresh air content 102. Centrifugal force is applied to both exhaust gas content 106 and fresh air content 102. Fresh air content 102 is low temperature high-density gas as compared to exhaust gas content 106, which is high temperature low-density gas. The magnitude of centrifugal force imparted to fresh air content 102 is thus greater than the magnitude of centrifugal force imparted to exhaust gas content 106.

The above description clearly indicates that intake port 90 serves as a second device for supplying fresh air, as the second gas, to combustion chamber 20 (see FIG. 1) for producing stratification of exhaust gas content 106 with fresh air content 102.

Figure 9:
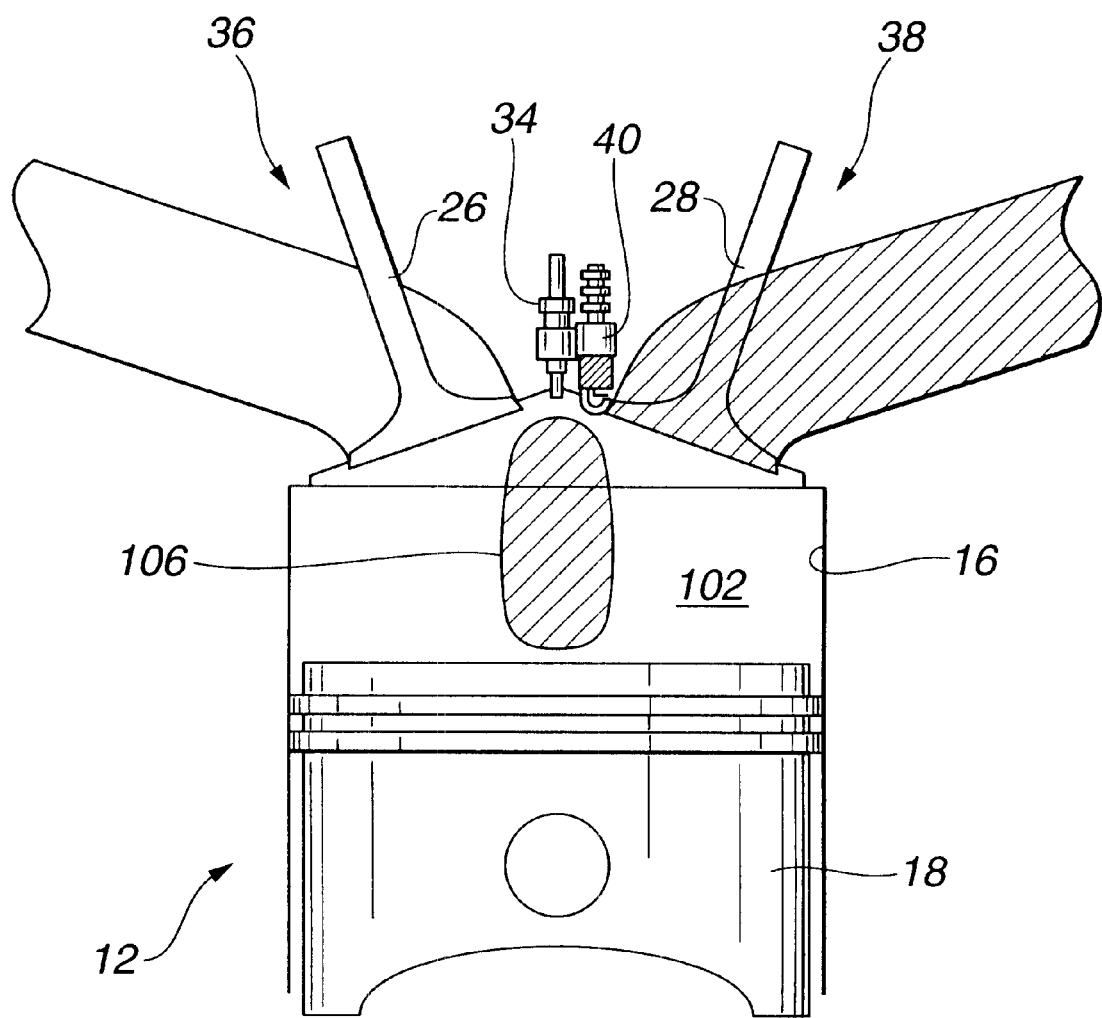
FIG. 9 is a diagram illustrating stratification between cylinder contents at a crank position during compression stroke.

FIG. 9 provides a diagram illustrating stratification between exhaust gas content 106 and fresh air content 102 at a crank position during compression stroke. In this embodiment, exhaust gas content 102 is located near the cylinder axis and occupies a volume. The volume of exhaust gas content 106 decreases as piston 18 ascends from the illustrated position toward top dead center of compression stroke.

If need arises for stronger swirl, intake port 90 may be replaced by a helical port.

With reference to FIGS. 1 and 9, system or method according to the present invention carries out a first injection of gasoline fuel into combustion chamber 20 for dispersion within fresh air content 102, and carries out a second injection of gasoline fuel into combustion chamber 20 for dispersion within exhaust gas content 106.

Figure 10:
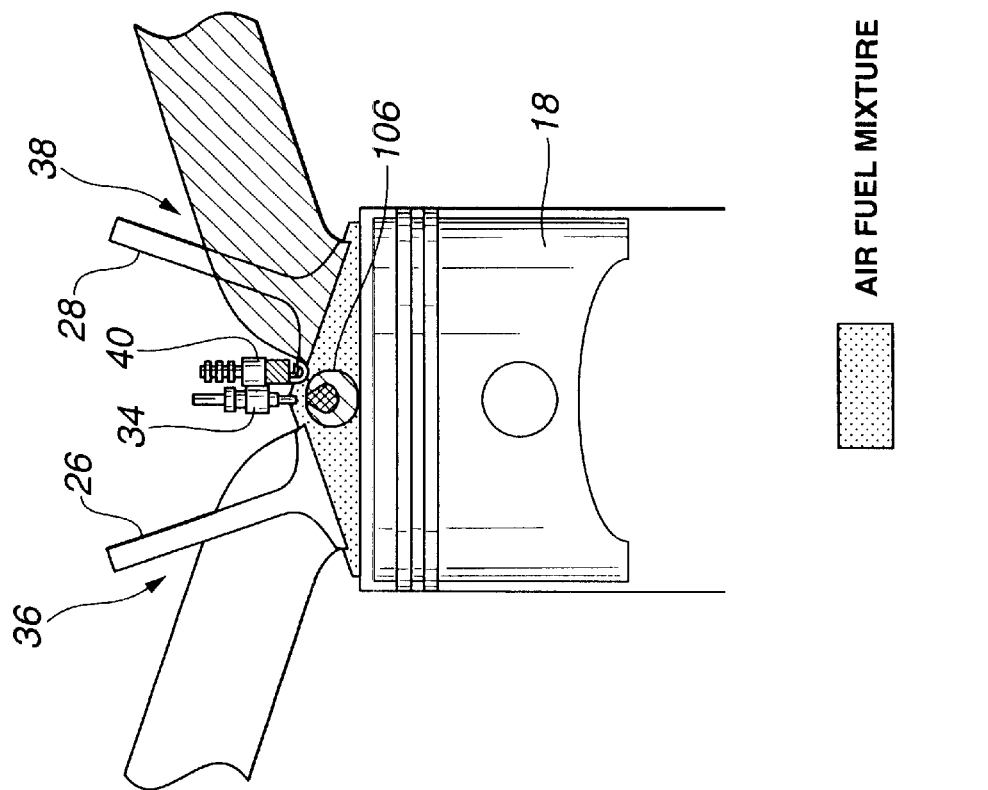
FIG. 10 is a diagram illustrating a first injection of gasoline fuel into a combustion chamber for dispersion within fresh air content of the combustion chamber surrounding exhaust gas content thereof.
Figure 11:
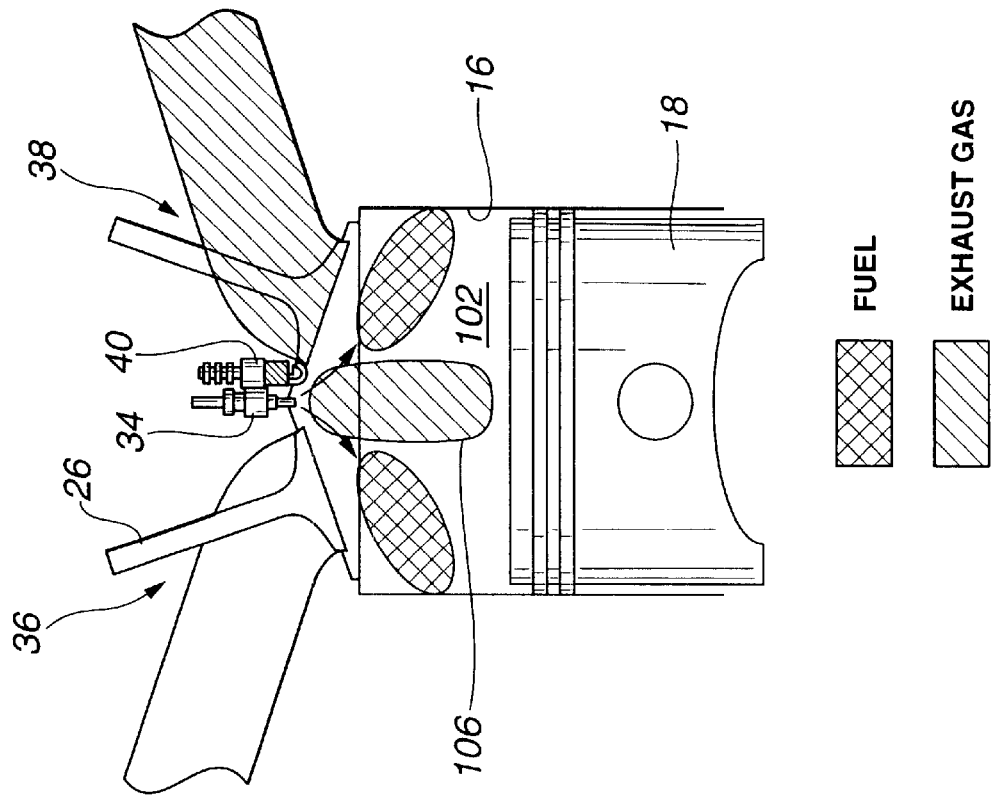
FIG. 11 is a diagram illustrating a second injection of gasoline fuel into combustion chamber for dispersion within the exhaust gas content.

With reference to FIGS. 10 and 11, in one embodiment according to the present invention, the fuel injection system 78 (see FIG. 2) activates fuel injector 34 for the first injection as shown in FIG. 10, and reactivates the fuel injector 34 for second injection as shown in FIG. 11.

Figure 12:
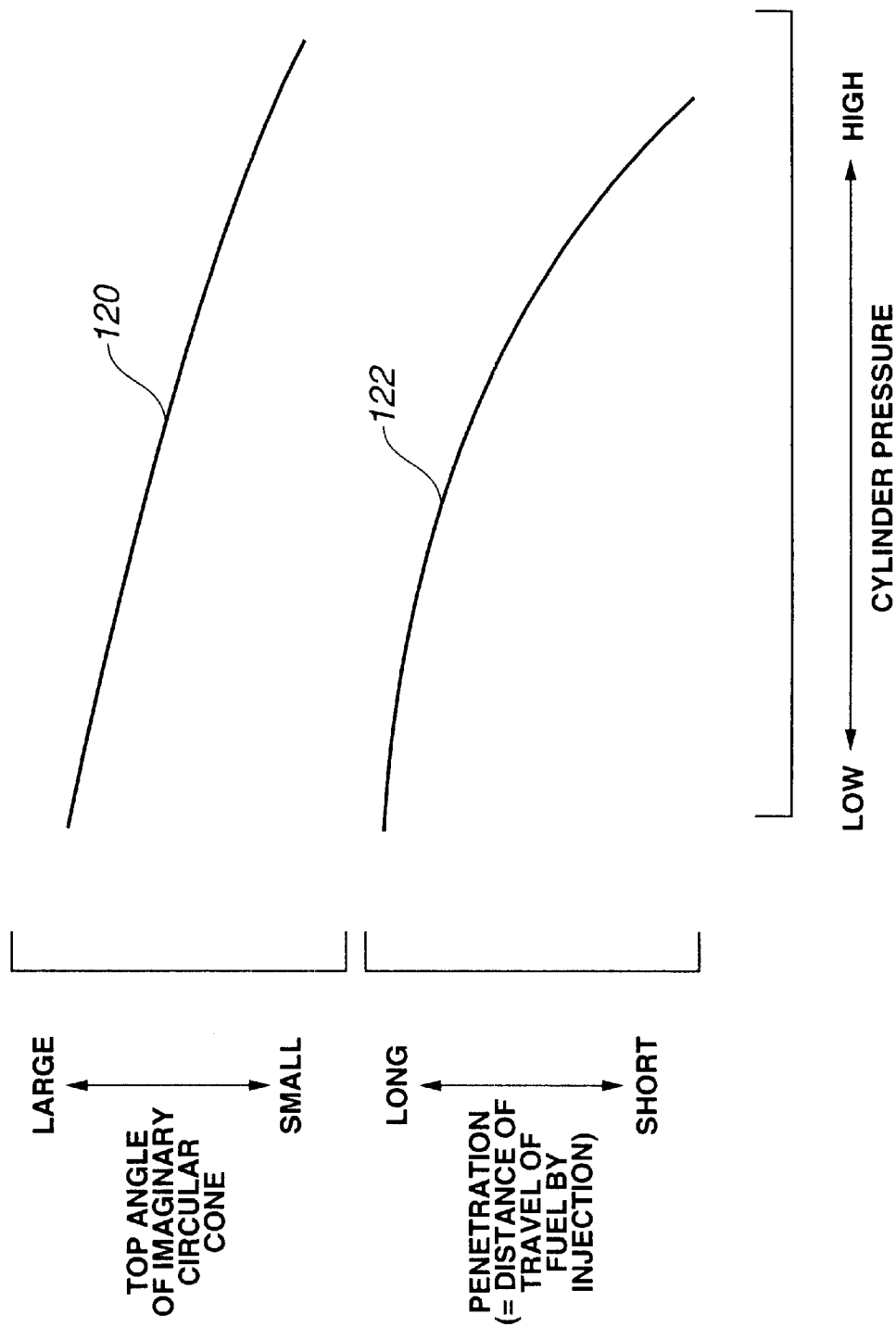
FIG. 12 is a graphical representation of performance of a fuel injector for direct injection into cylinder.

FIG. 12 illustrates performance curves 120 and 122 of fuel injector 34. Fuel injector 34 sprays gasoline fuel along an imaginary circular cone. The imaginary circular cone has a top angle. Curve 120 indicates how the top angle varies with variation of cylinder pressure. As cylinder pressure increases, distance of travel of fuel sprayed by fuel injector 34 for injection decreases. This distance is called "penetration". Curve 122 indicates how the penetration varies with variation of cylinder pressure. Curves 120 and 122 clearly indicate that the top angle becomes small and penetration becomes short as cylinder pressure increases.

Referring back to FIG. 10, the first injection begins at a crank position during intake stroke or the initial part of the subsequent compression stroke. Since cylinder pressure is still low, the top angle remains large and the penetration remains long. Thus, fuel droplets sprayed for the first injection reach fresh air content 102 for dispersion therein to form an air/fuel mixture.

Referring to FIG. 11, the second injection begins at around top dead center (TDC) of compression stroke. Since cylinder pressure is very high at around the TDC of compression stroke, the top angle becomes very small and the penetration becomes very short. Thus, fuel droplets sprayed for the second injection are dispersed within exhaust gas content 106.

In the above-mentioned embodiment, the same fuel injector 34 is used for the first and second injections. Different fuel injectors may be used to carry out the first and second injections for dispersion of gasoline fuel within fresh air content 102 and for dispersion of gasoline fuel within exhaust gas content, respectively.

Temperature of exhaust gas content 106 has been elevated to a level (as high as 1000 K) high enough for high temperature oxidation reaction of gasoline fuel at crank positions around top dead center of compression stroke. The second injection of gasoline fuel for dispersion within the exhaust gas content 106 causes the gasoline fuel to begin burning without any ignition delay, as mentioned before in connection with FIG. 7. This auto-ignition of gasoline fuel within exhaust gas content 106 generates heat and energy high enough to cause auto-ignition of gasoline fuel dispersed within fresh air content 102. Fuel quantity for the second injection determines amount of energy generated by auto-ignition of the fuel within exhaust gas content 106. For generating energy sufficiently high enough to induce auto-ignition of gasoline fuel within fresh air content 102, fuel quantity for the second injection should not exceed 10 percent of total fuel quantity for one cycle of combustion. This upper limit as high as 10 percent is preferable for reduction of NOx below a satisfactorily low level. The engine controller 14 can restrain fuel quantity for the second injection from exceeding 10 percent of total fuel quantity for one combustion cycle.

Figure 13:
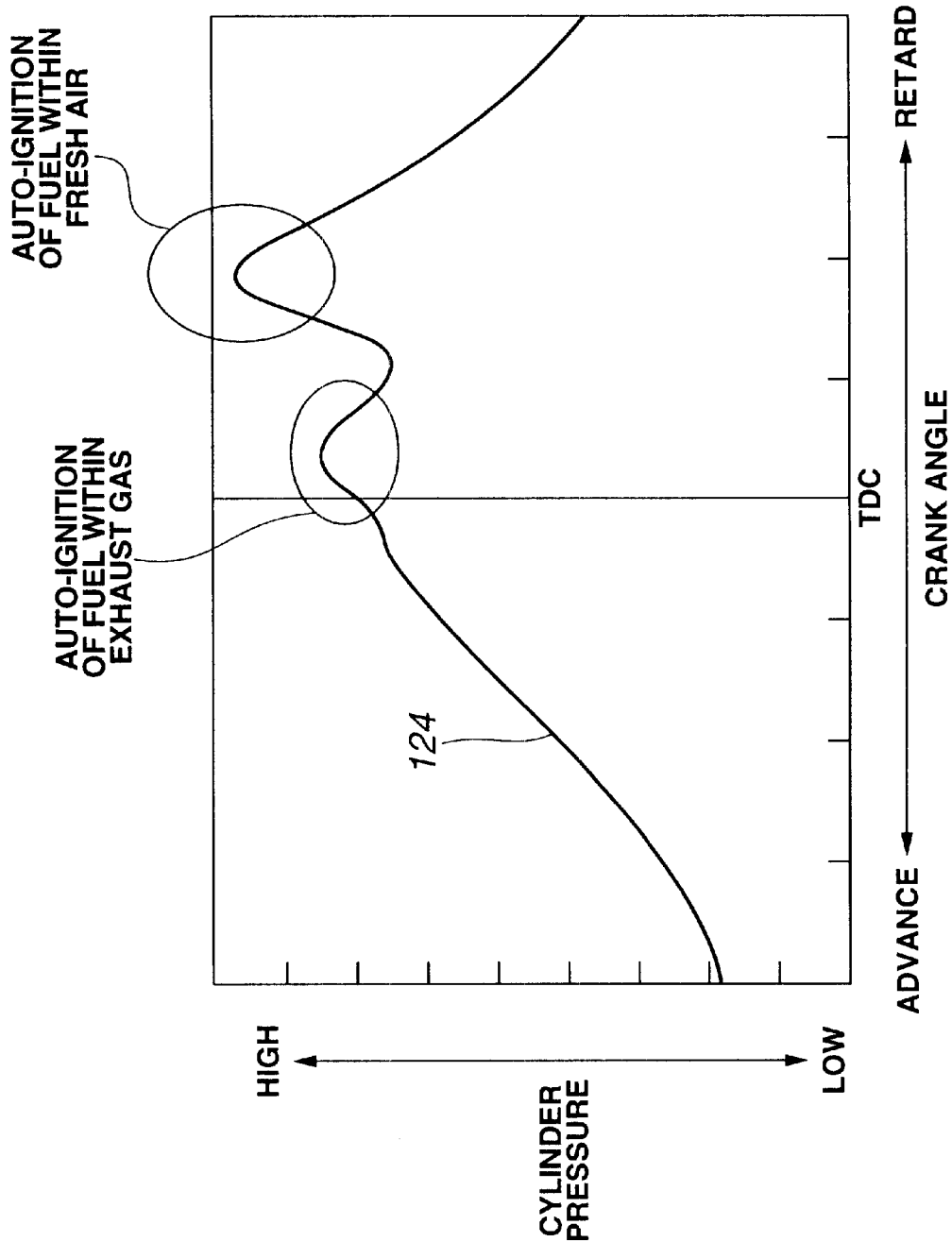
FIG. 13 provides a cylinder pressure curve across top dead center of compression stroke.
Figure 14:
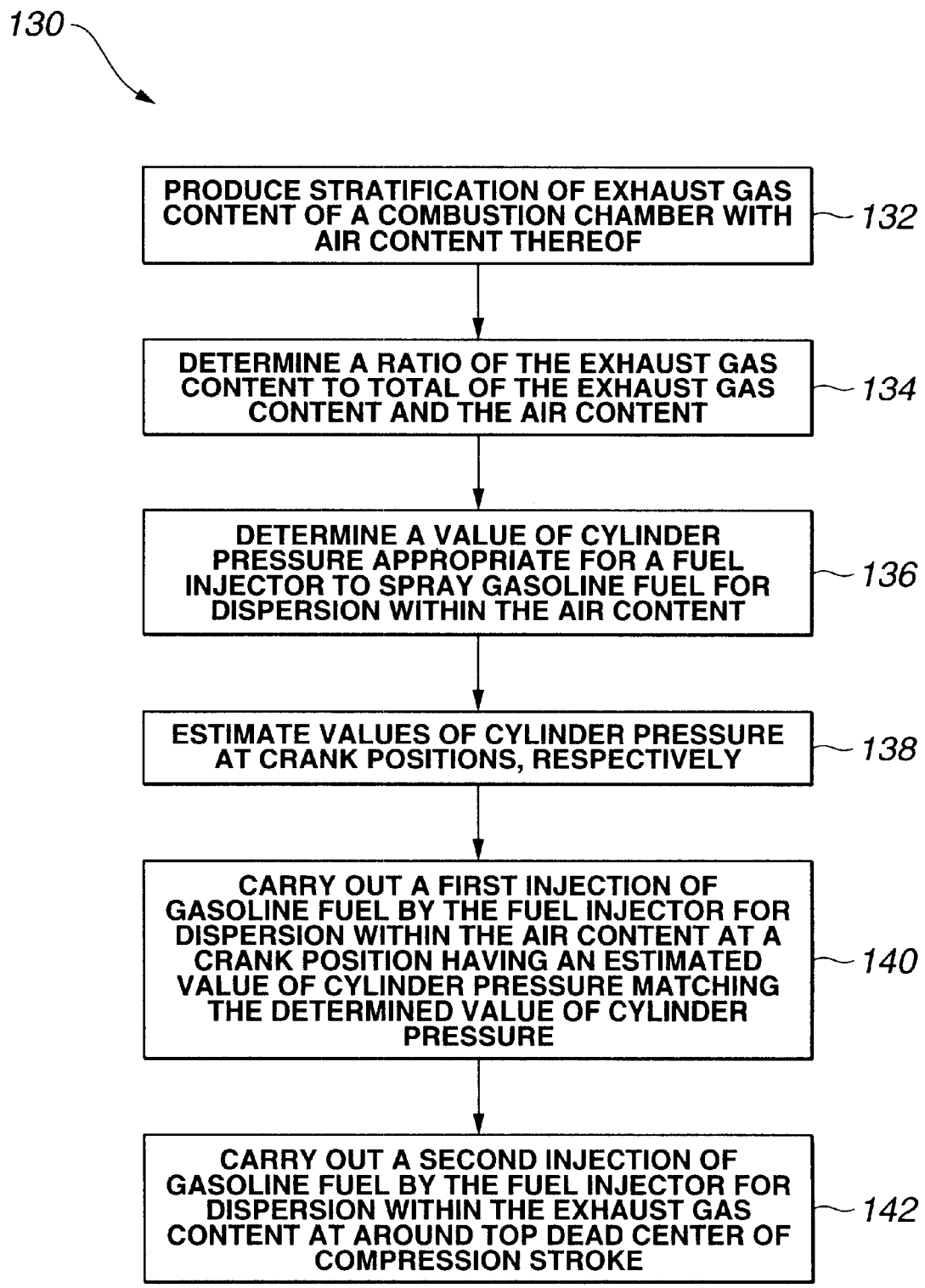
FIG. 14 is a block diagram illustrating one implementation of control logic according to the present invention.

With reference to FIG. 13, the illustrated pressure curve 124 clearly indicates that auto-ignition of fuel within exhaust gas content 106 causes auto-ignition of fuel within fresh air content 102.

From the preceding description, it will now be appreciated that controlling beginning of second injection can control beginning of high temperature oxidation reaction within exhaust gas content 106, which in turn controls beginning of burning of fuel within fresh air content 102.

Referring to FIG. 13, a preferred embodiment of a method of the present invention for widening auto-ignition range is generally indicated at 130. At block 132, stratification of exhaust gas content 106 of combustion chamber 20 with air content 102 thereof is produced. At block 134, an EGR rate, i.e., a ratio of the exhaust gas content 106 to total of the exhaust gas content 106 and the air content 102 is determined. Various values of the EGR rate may be found in a look-up table against engine speed and load. At block 136, a value of cylinder pressure appropriate for the fuel injector 34 to spray gasoline fuel for dispersion within the air content 102 is determined. Various values of cylinder pressure may be found in a look-up table against the EGR rate. In preparing this table, the performance curves 120 and 122 shown in FIG. 12 are taken into account so that fuel droplets sprayed by the fuel injector 34 may displace within the air content 102 only. At block 138, values of cylinder pressure at crank positions after each intake valve 36 closes are estimated. With the same crank position, cylinder pressure may take different values for different values of intake air pressure. Thus, intake air pressure is used in making the estimation by calculation or a table look-up operation. At block 140, a first injection of gasoline fuel by the fuel injector 34 for dispersion within the air content 102 is carried out at a crank position having an estimated value of cylinder pressure matching the determined value of cylinder pressure. At block 142, a second injection of gasoline fuel by the fuel injector 34 for dispersion within the exhaust gas content 106 is carried out at around top dead center of compression stroke.

Figure 15:
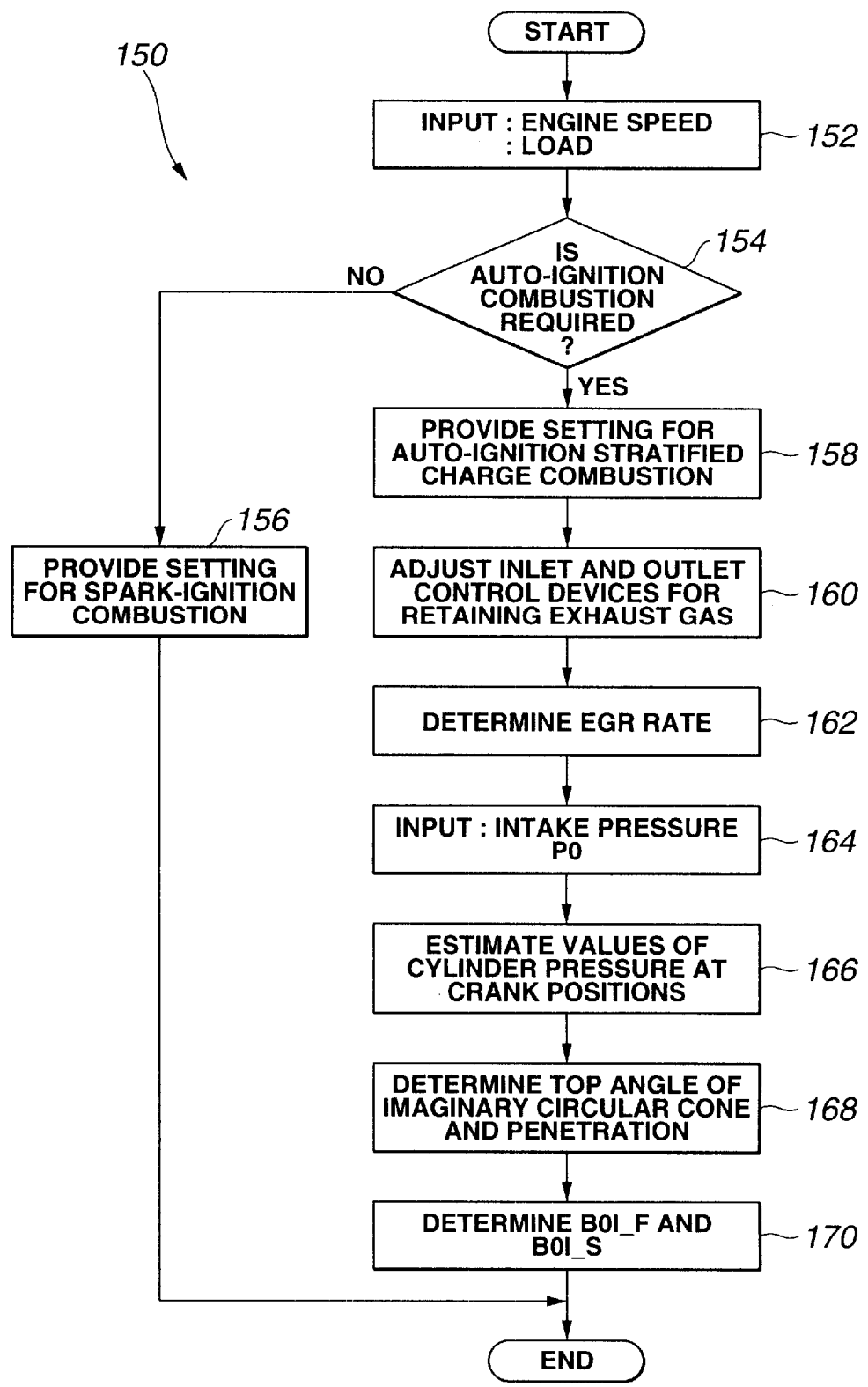
FIG. 15 is a flow diagram illustrating a flow of operations for carrying out control of the system of FIG. 1 according to one preferred embodiment of the present invention.

Referring to FIG. 15, the flow diagram illustrates a control routine, as generally indicated at 150, of the one preferred implementation of the present invention. In block 152, the engine controller 14 (see FIG. 2) inputs engine speed (RPM) and load (APO). In interrogation block 154, the controller 14 refers to a map as illustrated in FIG. 5 against engine speed and load to determine whether or not auto-ignition combustion is required. If this is not the case, spark-ignition combustion mode is required so that control goes to block 156. In block 156, the controller 14 provides setting for spark-ignition combustion.

If auto-ignition combustion is required, control goes from block 154 to block 158. In block 158, the controller 14 provides setting for auto-ignition combustion. In the next block 160, the controller 14 adjusts inlet and outlet control devices 36 and 38 for retaining exhaust gas in a manner as illustrated in FIG. 4.

In block 162, the controller 14 determines an EGR rate, i.e., a ratio of exhaust gas content 106 to the total of the exhaust gas content and fresh air content 102 (see FIGS. 10 and 11). The EGR rate may be determined as a function of a crank angle at which the outlet control device 38 closes. The crank angle at which the outlet control device 38 closes determines a volume of exhaust gas from the previous cycle retained for supply for the subsequent combustion cycle.

In block 164, the controller 14 inputs intake air pressure P0. In block 166, the controller 14 estimates values of cylinder pressure at crank angles subsequent to a crank angle at which the inlet control device 36 closes. In making this estimation, the intake air pressure P0 is used. Assuming compression of cylinder contents follows polytropic process, cylinder pressure Pθ at a crank position θ can be expressed as:

$$P\theta = P0 \times (V0/V\theta)^n$$

where: Pθ represents a value of cylinder pressure at a crank position θ,

P0 represents intake air pressure,

V0 represents a value of cylinder volume at a crank position at which inlet control device 36 closes, Vθ represents a value of cylinder volume at crank position θ, and n represents a polytropic index of 1.35.

The controller 14 may use the above equation to determine values of cylinder pressure Pθ at crank positions, respectively. In block 168, the controller 14 determines values of top angle of imaginary circular cone and value of penetration for each of the cylinder pressure values estimated in block 168 by referring to maps as illustrated by the performance curves 120 and 122 in FIG. 12 against each of the estimated cylinderpressure. Then, control goes to block 170. In block 170, the controller determines beginning of injection for first injection BOI_F and beginning of injection for second injection BOI_S after evaluating the determined EGR rate (at block 162) and various fuel spray patterns as indicated by top angle and penetration for crank positions, In block 166, the controller 14 may alter the polytropic index n in response to air/fuel ratio and/or load. If desired, the calculation of the equation may be avoided. In this case, values of cylinder pressure at crank positions are determined by simulation or experiments and stored in a non-volatile memory against crank positions, respectively. The controller 14 may refers to this data to determine values of cylinder pressure at crank positions.

Figure 16:
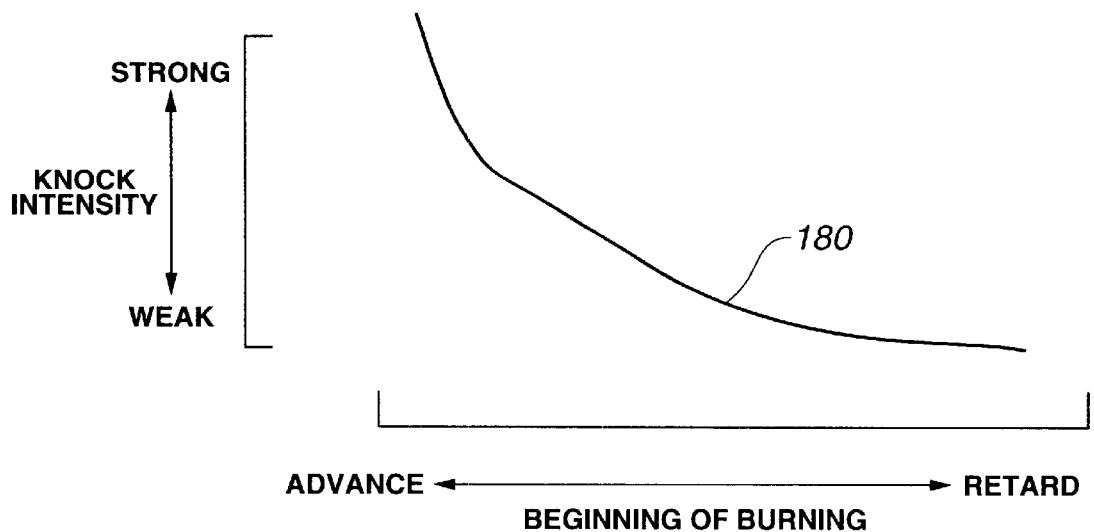
FIG. 16 is a graphical representation of how knock intensity varies if beginning of burning of gasoline fuel dispersed within fresh air content advances.
Figure 17:
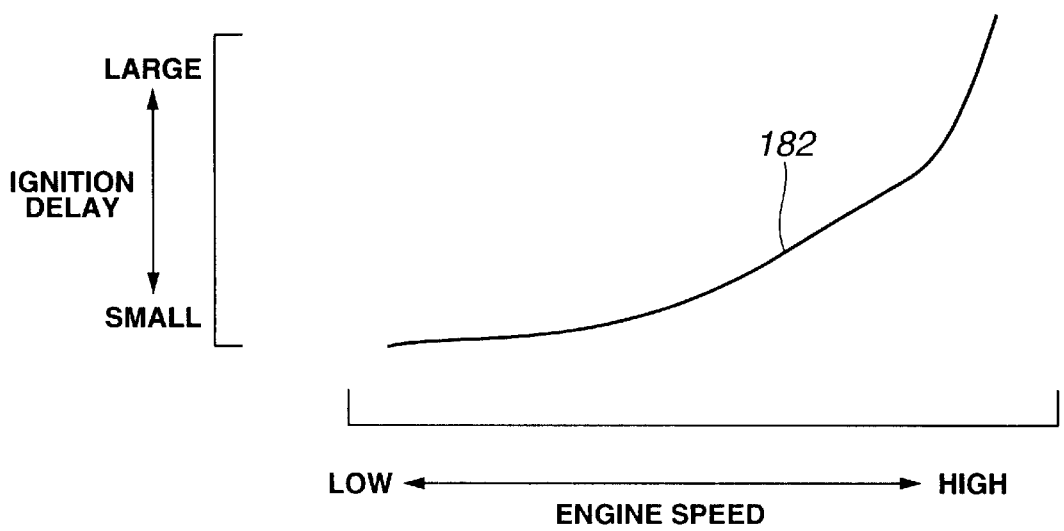
FIG. 17 is a graphical representation of how ignition delay, i.e., a delay between beginning of second injection and beginning of burning of gasoline fuel dispersed within fresh air content.

In a second embodiment, at least one of operating conditions including load and engine speed determines beginning of injection for second injection BOI_S. Referring to FIGS. 16 and 17, FIG. 16 provides a knock intensity variation curve 180, while FIG. 17 provides an ignition delay variation curve 182.

Curve 180 of FIG. 16 clearly indicates that if beginning of burning of gasoline fuel dispersed within fresh air content 102 advances, knock intensity becomes strong. This is because temperature and pressure become high at around top dead center of compression stroke, causing rapid burning to take place. Auto-ignition range may extend toward high load by retarding beginning of burning of gasoline fuel within fresh air content 102 as load request becomes high. In the second embodiment, engine controller 14 retards beginning of second injection as load request becomes high.

Curve 182 of FIG. 17 clearly indicates that an ignition delay becomes large as engine speed becomes high. The ignition delay represents a delay in terms of crank angle between beginning of second injection and beginning of burning of gasoline fuel within fresh air content 102. In the second embodiment, engine controller 14 advances beginning of second injection as engine speed becomes high.

In the second embodiment, the beginning of second injection is subject to variation in response to load request and/or engine speed within the neighborhood of top dead center of compression stroke. Thus, cylinder pressure at which second injection begins is still at a level high enough for fuel injector 34 to spray gasoline fuel for dispersion within exhaust gas content 106.

Figure 18:
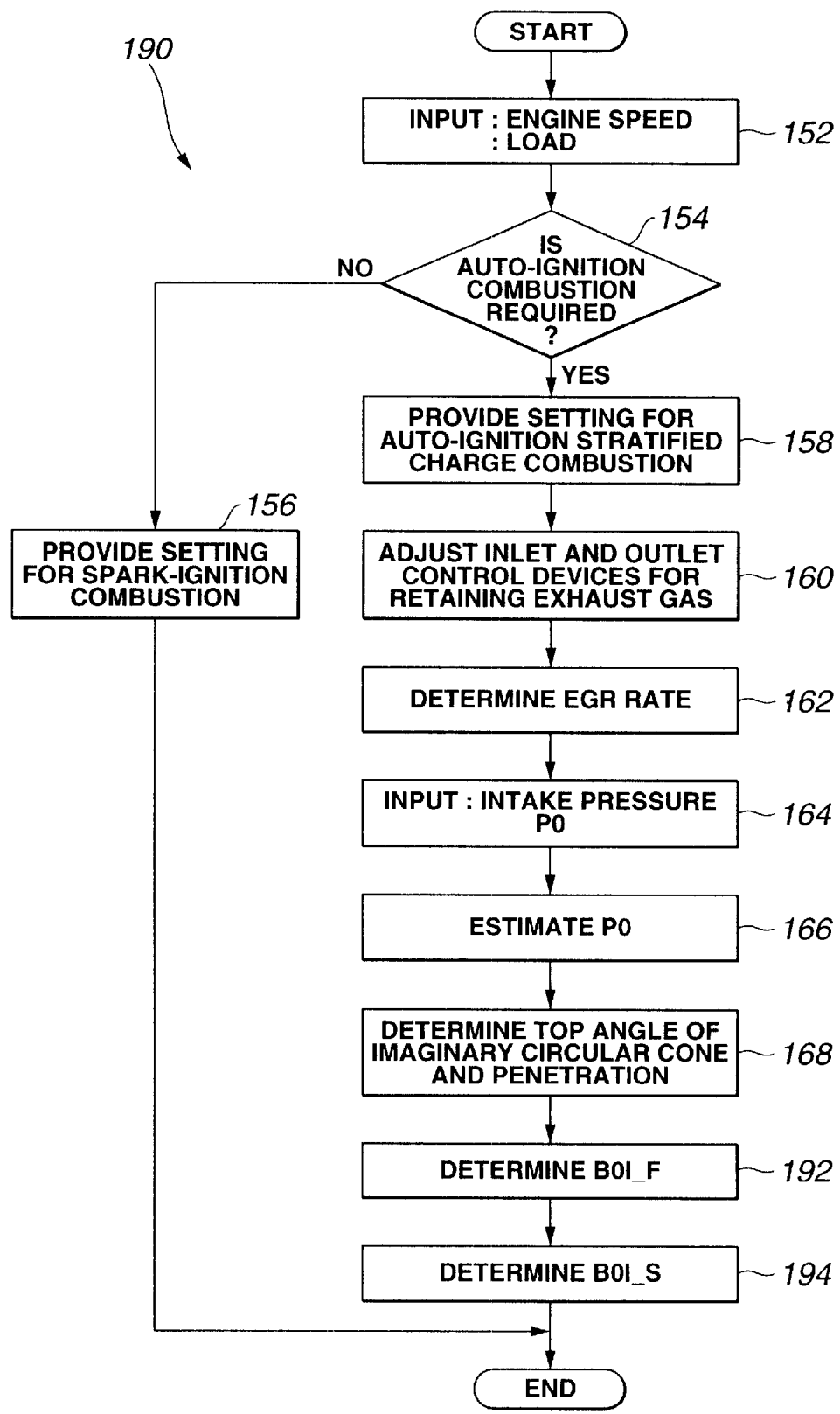
FIG. 18 is a flow diagram illustrating a flow of operations for carrying out control of the system of FIG. 1 according to another preferred embodiment of the present invention.
Figure 19:
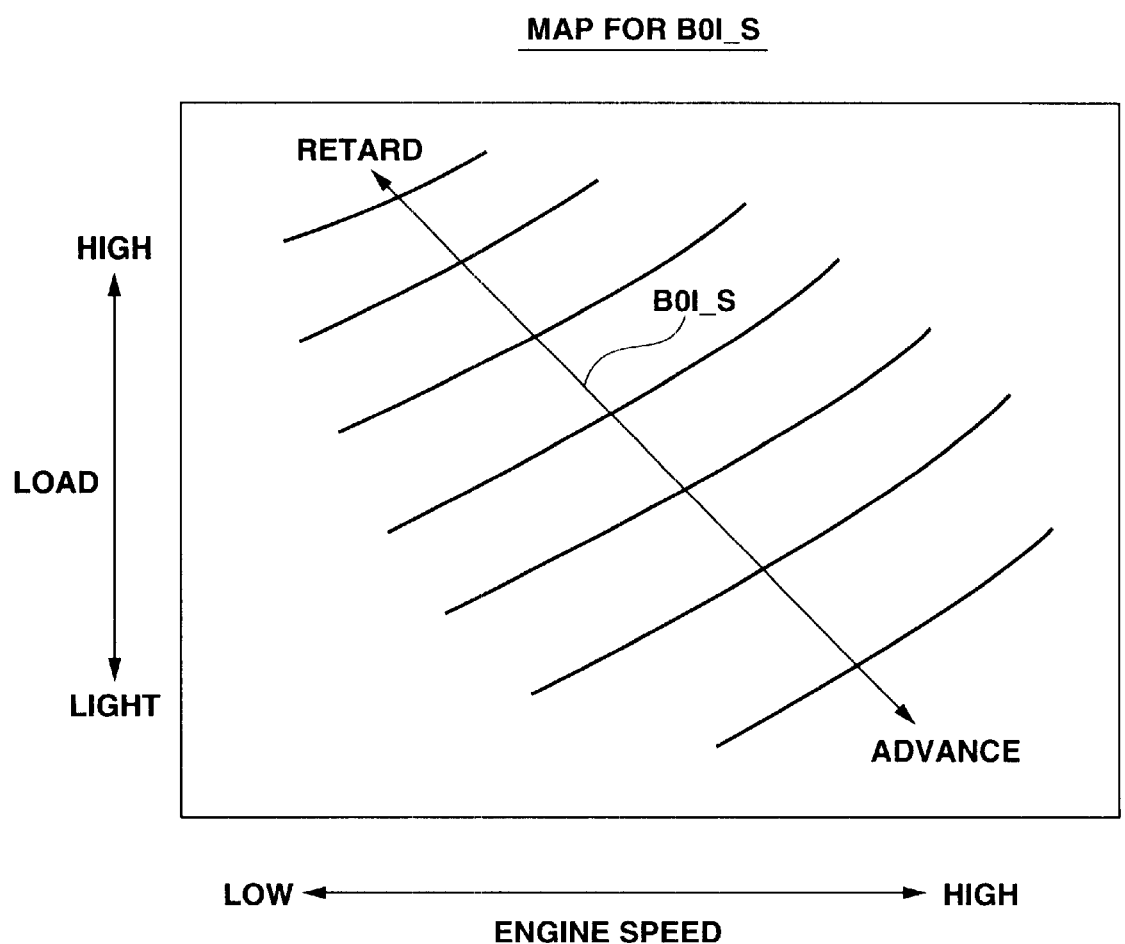
FIG. 19 is a map containing optimum crank positions for beginning of injection for second injection against load and engine speed.

The flow diagram of FIG. 18, generally indicated at 190, illustrates a flow of operations for carrying out control of the system of FIG. 1 according to the second embodiment of the present invention. FIG. 19 is a map containing optimum crank positions for beginning of injection for second injection against load and engine speed. This map is used in determining beginning of injection for second injection BOI_S in the flow diagram FIG. 18. The flow diagram 190 of FIG. 18 is substantially the same as flow diagram 150 of FIG. 15. Thus, like reference numerals designate like or corresponding blocks in FIGS. 15 and 18. However, flow diagram 190 is different from flow diagram 150 in that although beginning of injection for first injection BOI_F is determined in block 192 in substantially the same manner as it was determined in block 170 of FIG. 15, beginning of injection for second injection BOI_S is determined in block 194 by performing a table look-up operation of the map shown in FIG. 19 against load and engine speed. As will be readily understood from the map of FIG. 19, BOI_S retards as load becomes high and it advances as engine speed becomes high.

Referring back to FIG. 1, in a third preferred embodiment of the present invention, temperature of exhaust gas within an exhaust port is detected by exhaust gas temperature sensor 44, and EGR rate, i.e., a ratio of quantity of exhaust gas content 106 to total quantity of the exhaust gas content 106 and fresh air content 102 is increased as the temperature of exhaust gas drops.

Figure 20A:
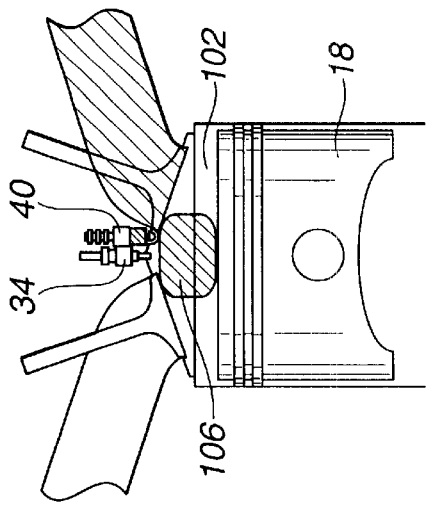
FIG. 20A is a diagram illustrating quantity of exhaust gas content at around top dead center of compression stroke when exhaust gas from the previous cycle has a normal level of temperature.
Figure 20B:
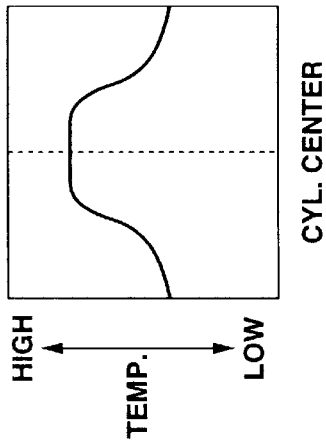
FIG. 20B is a temperature distribution within combustion chamber of FIG. 20A.

Referring to FIGS. 20A and 20B, FIG. 20A illustrates quantity of exhaust gas content 106 at around top dead center of compression stroke when exhaust gas from the previous cycle has a normal level of temperature, and FIG. 20B provides a temperature distribution within the combustion chamber of FIG. 20A. If temperature of exhaust gas Texh from the previous cycle is high enough and at the normal level, temperature of exhaust gas content 106 becomes high enough to allow high temperature oxidation reaction of gasoline fuel at around top dead of compression stroke irrespective of variation of EGR rate.

Figure 21A:
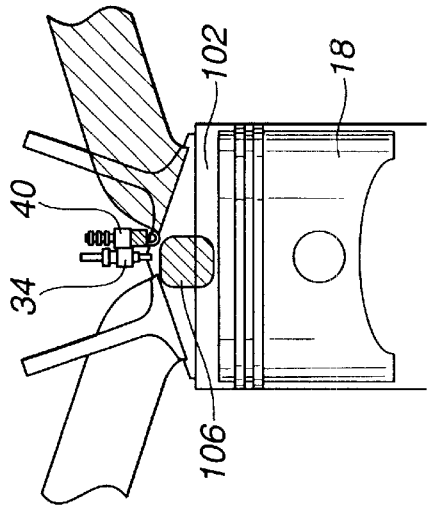
FIG. 21A is a diagram illustrating quantity of exhaust gas content at around top dead center of compression stroke when exhaust gas from the previous cycle has temperature considerably lower than the normal level of temperature.
Figure 21B:
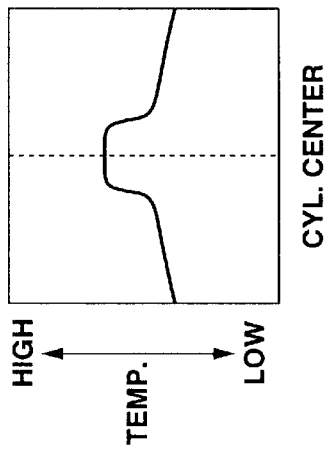
FIG. 21B is a temperature distribution within combustion chamber of FIG. 21A.

Referring to FIGS. 21A and 21B, FIG. 21A illustrates quantity of exhaust gas content 106 at around top dead center of compression stroke when exhaust gas from the previous cycle has temperature considerably lower than the normal level of temperature, and FIG. 21B is a temperature distribution within the combustion chamber of FIG. 21A. In this case, temperature of exhaust gas content 106 cannot become high enough to allow high temperature oxidation reaction of gasoline fuel at around top dead of compression stroke. As a result, it is difficult to sustain high temperature oxidation reaction of gasoline fuel.

According to the third preferred embodiment, high temperature oxidation reaction of gasoline fuel is sustained by increasing EGR rate, i.e., a ratio of quantity of exhaust gas content 106 to total quantity of exhaust gas content 106 and fresh air content 102 when exhaust gas temperature Texh drops.

Figure 22A:
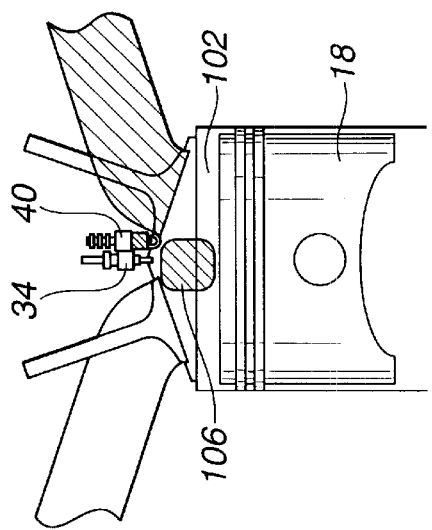
FIG. 22A is a diagram illustrating increased quantity of exhaust gas content at around top dead center of compression stroke when exhaust gas from the previous cycle has temperature considerably lower than the normal level of temperature.
Figure 22B:
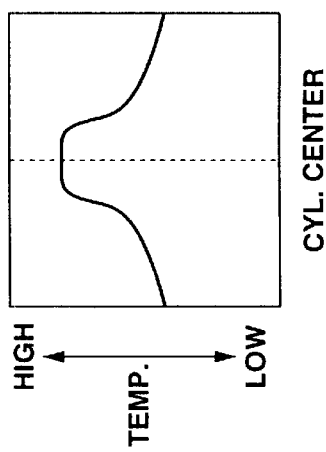
FIG. 22B is a temperature distribution within combustion chamber of FIG. 22A.

FIG. 22A illustrates increased quantity of exhaust gas content 106 at around top dead center of compression stroke when exhaust gas from the previous cycle has temperature considerably lower than a normal level of temperature, and FIG. 22B is a temperature distribution within combustion chamber of FIG. 22A. The temperature distribution clearly indicates that the temperature of exhaust gas content 106 has elevated sufficiently high owing to an increased conservation of heat within exhaust gas content 106.

Figure 23:
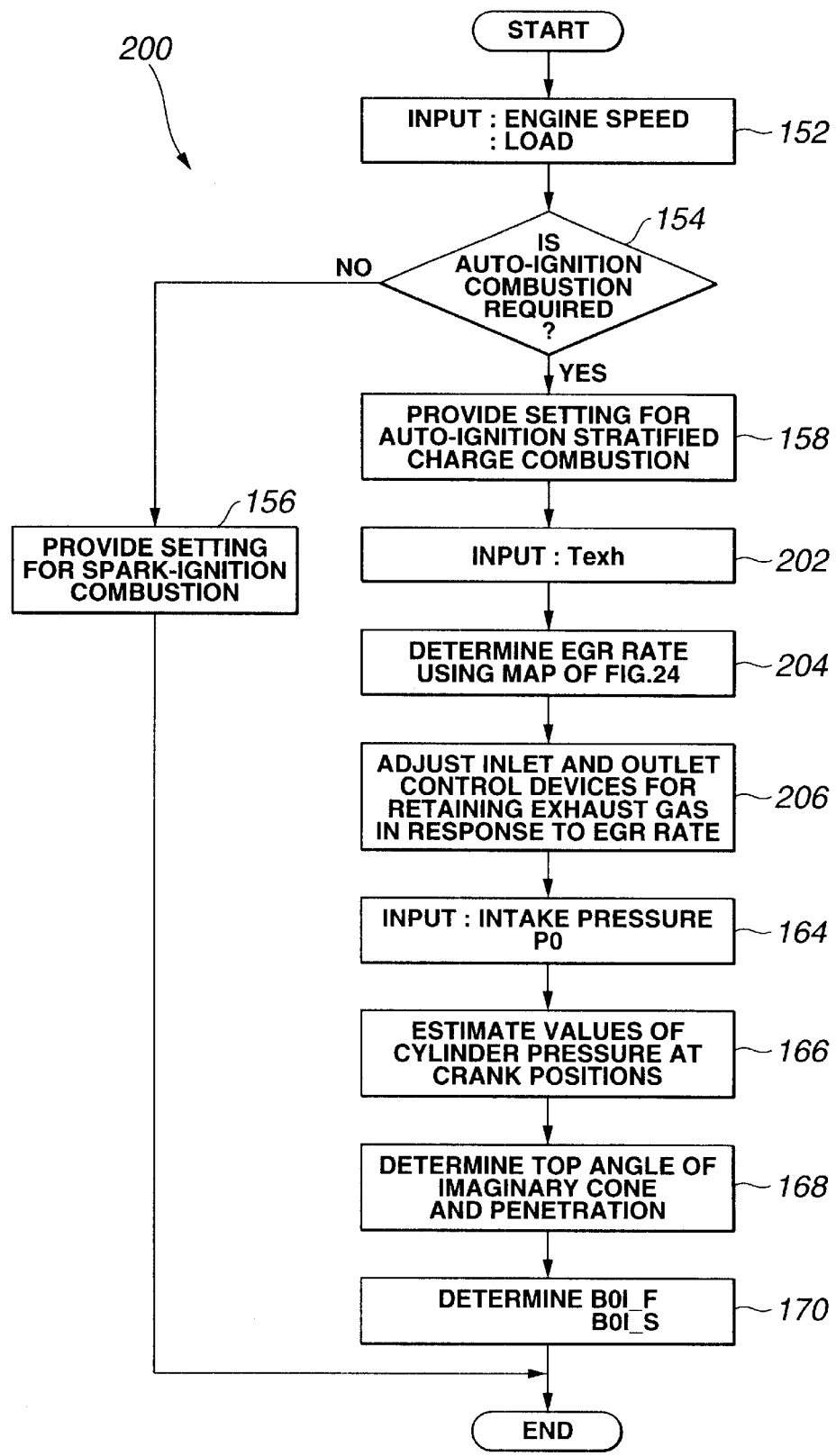
FIG. 23 a flow diagram illustrating a flow of operations for carrying out control of the system of FIG. 1 according to still another preferred embodiment of the present invention.
Figure 24:
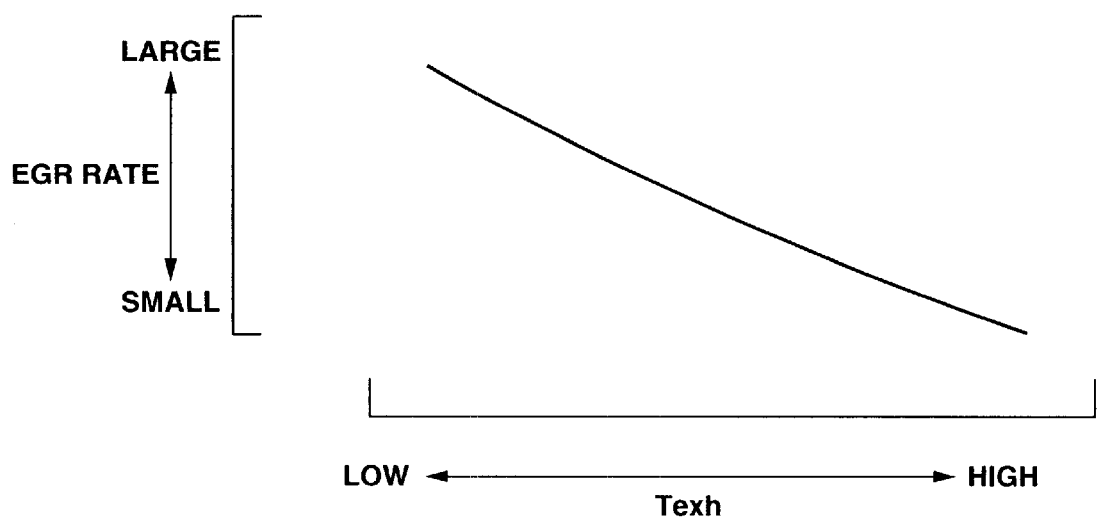
FIG. 24 is a map containing optimum or desired values of EGR rate against varying values of temperature of exhaust gas.

The flow diagram of FIG. 23, generally indicated at 200, illustrates a flow of operations for carrying out control of the system of FIG. 1 according to the third preferred embodiment of the present invention. FIG. 24 is a map, stored in a non-volatile memory, containing optimum values of EGR rate against varying values of exhaust gas temperature Texh. In the third embodiment, a desired value in EGR rate is found in the map of FIG. 24 against exhaust gas temperature Texh, and inlet and outlet control devices 36 and 38 are adjusted in response to EGR rate to vary exhaust gas retaining duration (minus overlap in FIG. 4).

Flow diagram 200 of FIG. 23 is substantially the same lo as flow diagram 150 of FIG. 15. Thus, like reference numerals designate like or corresponding blocks in FIGS. 15 and 23.

However, flow diagram 200 is different from flow diagram 150 in that blocks 202, 204, and 206 have replaced blocks 160 and 162 of FIG. 15.

In FIG. 23, controller 14 input exhaust gas temperature Texh in block 202. In the next block 204, controller 14 determines EGR rate by performing a table look-up operation of map shown in FIG. 24 using Texh. In block 206, controller 14 adjusts inlet and outlet control devices 36 and 38 for retaining exhaust gas in response to EGR rate determined in block 204.

Specifically, the exhaust gas retaining duration is varied against variation of EGR rate determined in block 204. In this flow diagram 200, the EGR rate, which has been determined in block 204, is used in determining BOI_F and BOI_S in block 170 in the same manner as EGR rate determined in block 162 was used in determining BOI_F and BOI_S in block 170 in FIG. 15.

In the embodiment, exhaust gas temperature is detected and used for processing. If desired, exhaust gas temperature may be estimated and the estimated value of exhaust gas temperature may be used for processing.

Figure 25:
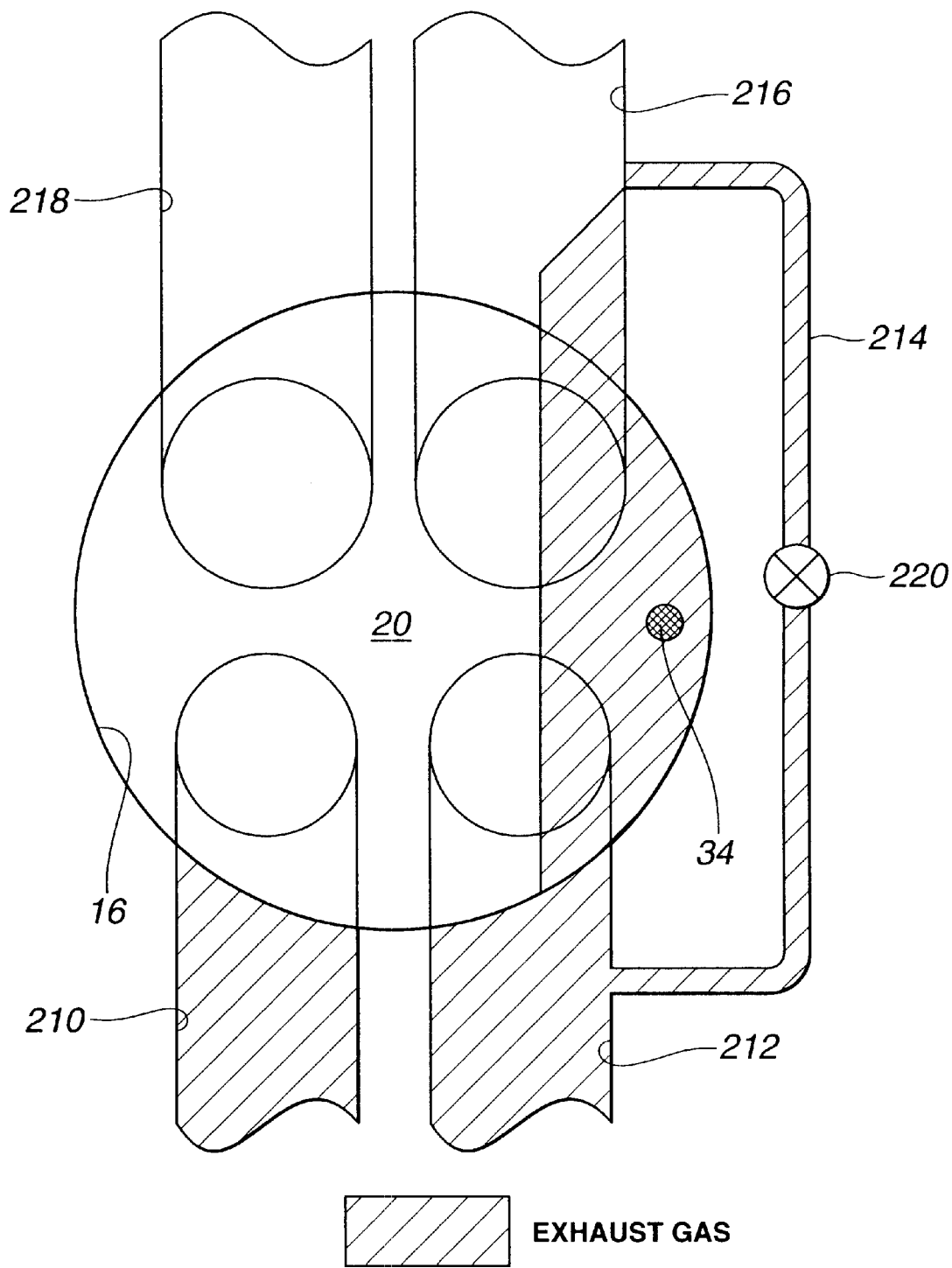
FIG. 25 is a diagram, similar to FIG. 8, illustrating how to supply exhaust gas to a combustion chamber and fresh air thereto for stratification of exhaust gas content with fresh air content.
Figure 27:
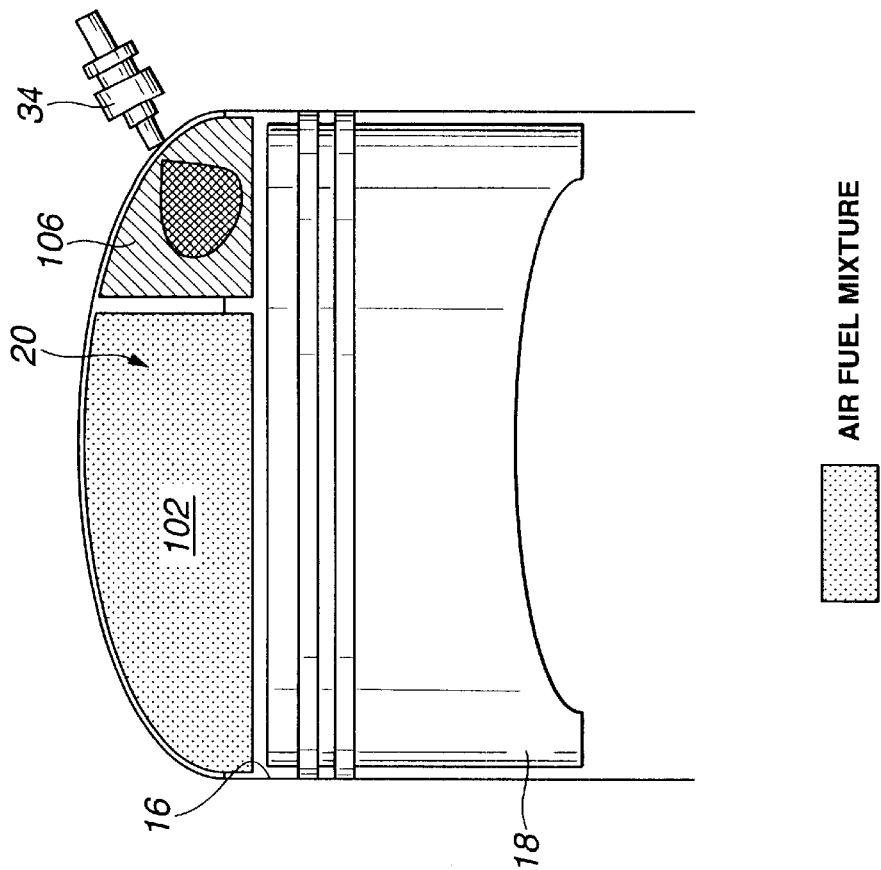
FIG. 27 is a diagram, similar to FIG. 11, illustrating a second injection of gasoline fuel into combustion chamber for dispersion within the exhaust gas content.
Figure 26:
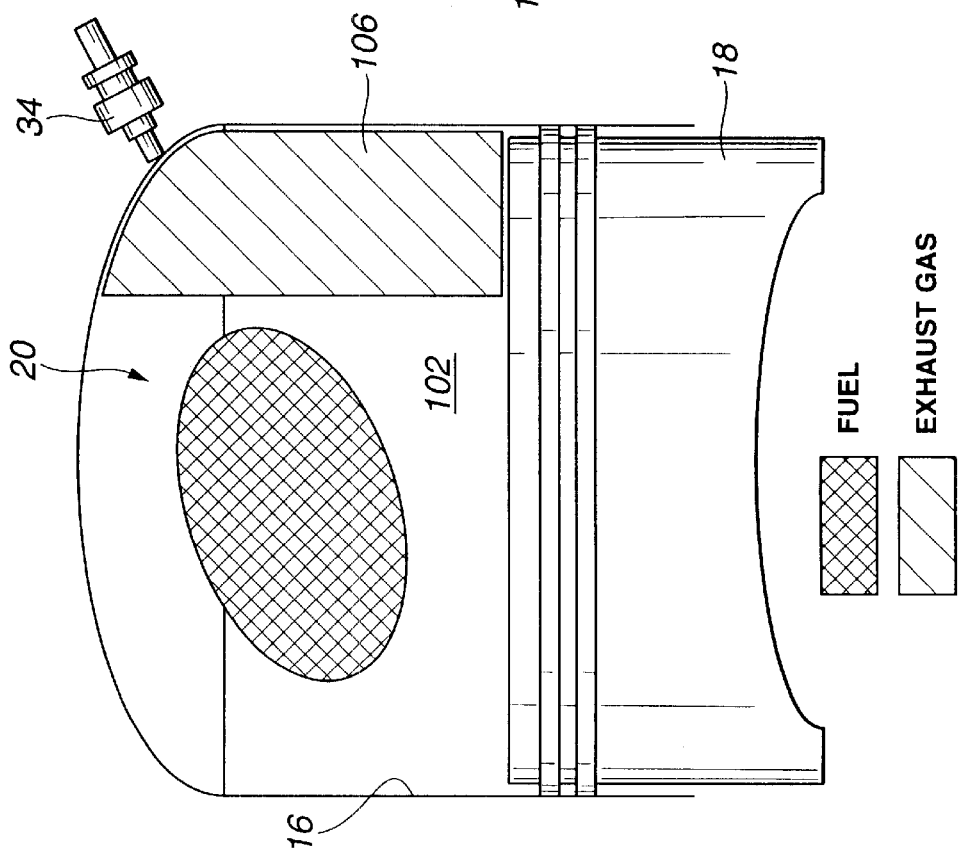
FIG. 26 is a diagram, similar to FIG. 10, illustrating a first injection of gasoline fuel into a combustion chamber for dispersion within fresh air content of the combustion chamber.

Referring to FIGS. 25–27, in a fourth embodiment, supply of exhaust gas to form exhaust gas content 106 of a combustion chamber 20 is fed from one of two exhaust ports 210 and 212 after passing through an external EGR pipe 214 as different from a technique employed in the preceding embodiments to retain exhaust gas. EGR pipe 214 has an inlet end coupled to exhaust port 212 and an outlet end coupled to an intake port 216. Intake port 216 is coupled to cylinder 16 for supplying the exhaust gas to combustion chamber 20. Another intake port 218 is coupled to cylinder 16 for supplying fresh air to combustion chamber 20 thereby to place the exhaust gas content locally within combustion chamber 20. An EGR valve 220 is provided to regulate flow through EGR pipe 214. A fuel injector 34 is located for direct injection of gasoline fuel for dispersion within fresh air content 102 during a first injection as shown in FIG. 26 and for direct injection of gasoline fuel for dispersion within exhaust gas content 106 during a second injection as shown in FIG. 27.

Figure 28:
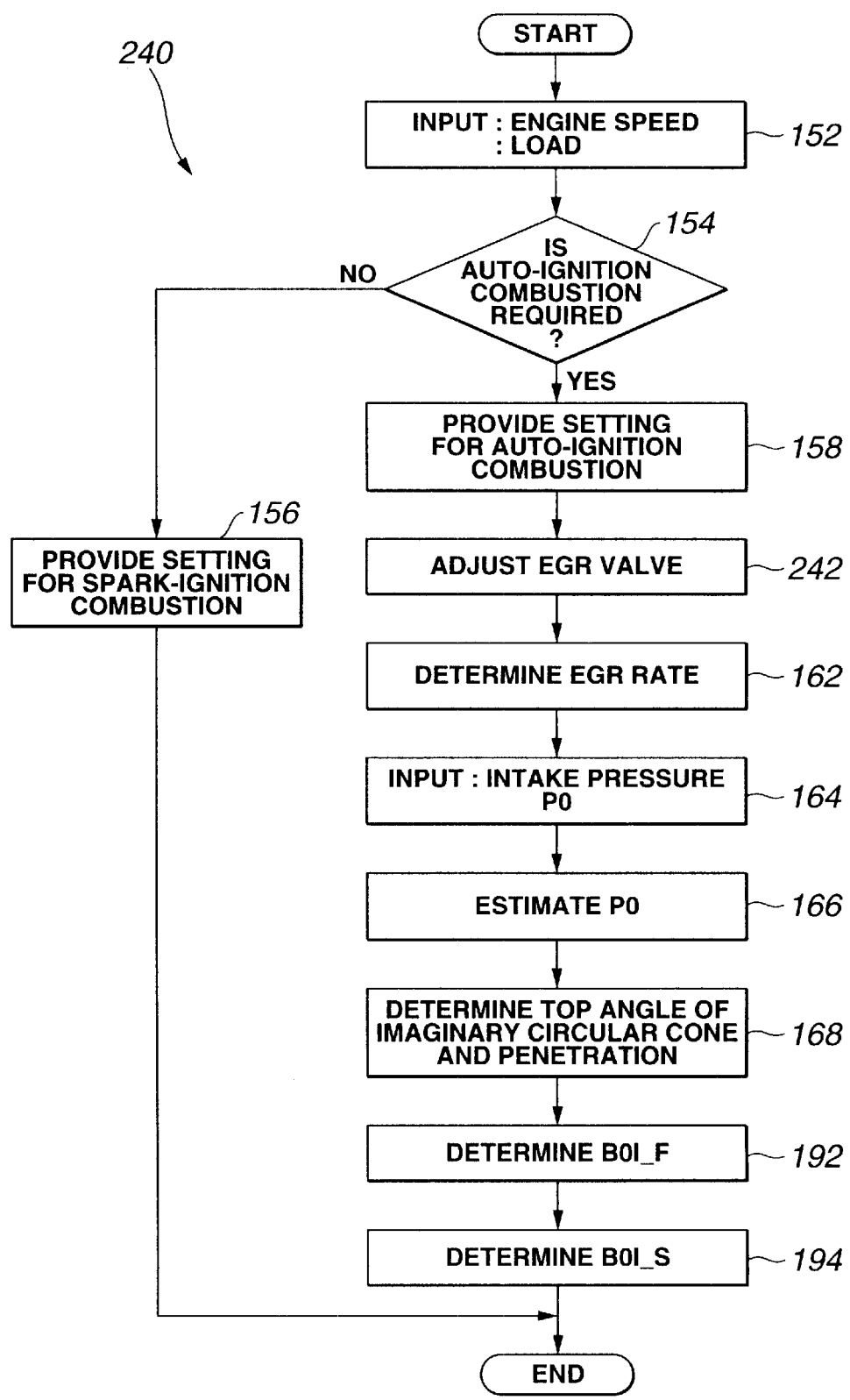
FIG. 28 is a flow diagram illustrating a flow of operations for carrying out control of the system of FIG. 1 as modified as illustrated in FIG. 25 according to further preferred embodiment of the present invention.

FIG. 28 provides a flow diagram, as generally indicated at 240, illustrating a flow of operations for carrying out control of the system of FIG. 1 as modified as illustrated in FIG. 25 according to the fourth preferred embodiment of the present invention.

Flow diagram 240 of FIG. 28 is substantially the same as flow diagram 190 of FIG. 18. Thus, like reference numerals designate like or corresponding blocks in FIGS. 18 and 28. However, flow diagram 240 is different from flow diagram 190 in that block 242 has replaced block 160 of FIG. 18.

In FIG. 28, controller 14 adjusts or controls EGR valve 220 to provide an appropriate quantify of exhaust gas supply to intake port 216 during intake stroke of piston 18.

Figure 32:
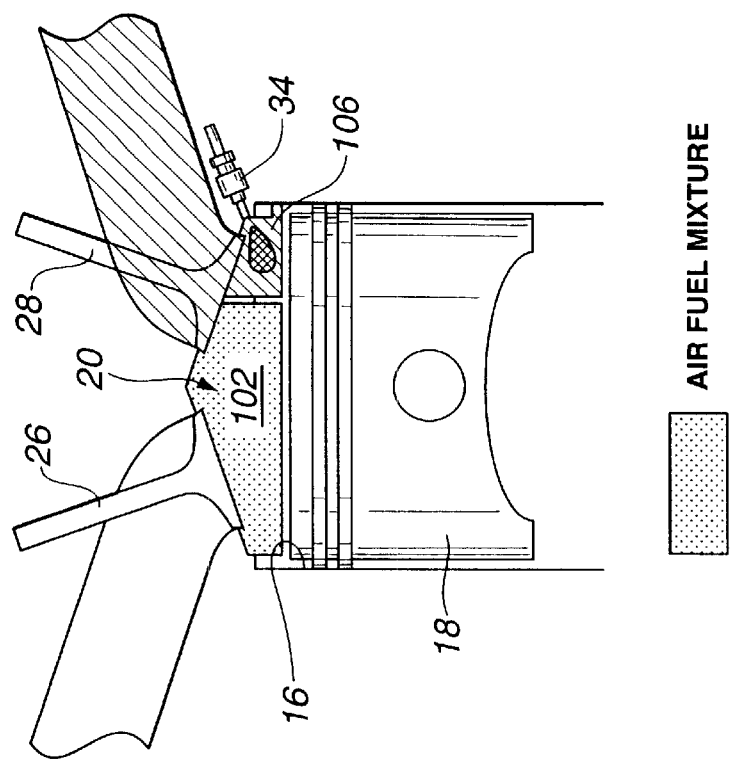
FIG. 32 is a diagram, similar to FIG. 26, illustrating a first injection of gasoline fuel into a combustion chamber for dispersion within fresh air content of the combustion chamber.
Figure 33:
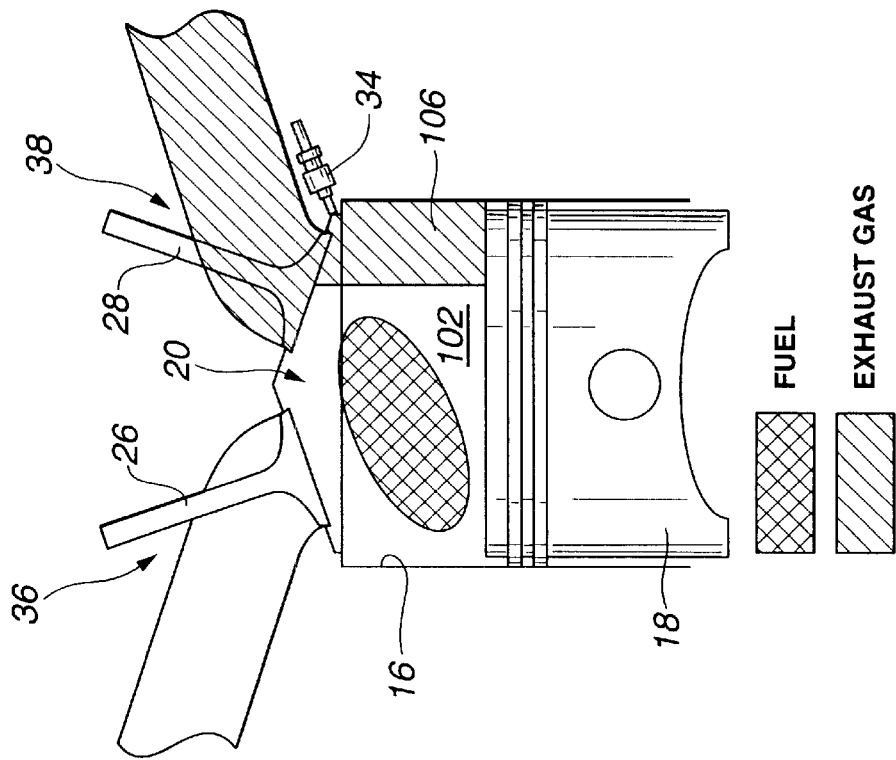
FIG. 33 is a diagram, similar to FIG. 27, illustrating a second injection of gasoline fuel into combustion chamber for dispersion within the exhaust gas content.

Referring to FIGS. 29A to 29D, in a fifth embodiment of the present invention, stratification is produced by adjusting inlet and outlet control devices 36 and 38 so as to open intake and exhaust ports during at least a part of intake stroke as readily seen from FIGS. 29A and 31 to draw exhaust gas from at least one of exhaust ports into combustion chamber 20. As shown in FIGS. 32 and 33, a fuel injector is located near exhaust port side for first and second injections.

FIG. 30 is a valve lift diagram for spark-ignition combustion mode and FIG. 31 is a valve lift diagram for auto-ignition combustion mode. The valve lift diagram of FIG. 31 clearly show that both intake and exhaust valves 26 and 28 open during intake stroke to allow supply of exhaust gas to combustion chamber 20.

FIG. 32 is a diagram illustrating first injection of gasoline fuel into combustion chamber 20 for dispersion within fresh air content 102 of the combustion chamber. FIG. 33 is a diagram illustrating second injection of gasoline fuel into combustion chamber 20 for dispersion within exhaust gas content 106.

While the present invention has been particularly described, in conjunction with preferred implementations and embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. 2000-143860, filed May 16, 2000, the disclosure of which is hereby incorporated by reference in its entirety.

What is claimed is:

1. A lean burn internal combustion engine having at least one cylinder with a piston reciprocating therein to define a combustion chamber, comprising:
    a first device for supplying first oxygen containing gas to the combustion chamber;
    a second device for supplying second oxygen containing gas to the combustion chamber for producing stratification, within the combustion chamber, of first gas content with second gas content, the first gas being higher in temperature than the second gas; and
    a fuel injection system for carrying out a first injection of gasoline fuel into the combustion chamber for dispersion within the second gas content, and for carrying out a second injection of gasoline fuel into the combustion chamber for dispersion within the first gas content, thereby to accomplish auto-ignition of gasoline fuel within the first gas content of the combustion chamber.

2. The engine as claimed in claim 1, wherein the first gas is exhaust gas from the previous cycle, and the second gas is air.

3. The engine as claimed in claim 2, further comprising a controller for adjusting beginning of the second injection at around top dead center position of compression stroke of the piston.

4. The engine as claimed in claim 3, wherein the controller determines beginning of the second injection in response to at least one of operating conditions of the engine.

5. The engine as claimed in claim 3, wherein the controller determines load request, and retards beginning of the second injection as the determined load request becomes high.

6. The engine as claimed in claim 3, wherein the controller determines engine speed of the engine, and advances beginning of the second injection as the engine speed becomes high.

7. The engine as claimed in claim 3, wherein the controller restrains fuel quantity for the second injection from exceeding 10 percent of total fuel quantity for one cycle of combustion.

8. The engine as claimed in claim 3, wherein the fuel injection system includes a fuel injector for direct injection of gasoline fuel into the combustion chamber, and wherein the controller activates the fuel injector for the first injection and reactivates the fuel injector for the second injection.

9. The engine as claimed in claim 3, wherein the first device includes:
    an inlet control device for controlling flow into the combustion chamber; and
    an outlet control device for controlling flow out of the combustion chamber, the inlet and outlet control devices being SO adjusted as to retain exhaust gas from the previous cycle, as the first gas, during exhaust stroke of the piston; and wherein the second device includes:
    an intake port coupled to the cylinder to provide an intake arrangement whereby the second gas drawn through the intake port into the combustion chamber generates swirl about a cylinder axis within the combustion chamber to displace the first gas content inwardly toward the cylinder axis for producing stratification of the first gas content with the second gas content.

10. The engine as claimed in claim 3, wherein the first device includes:
    an intake port coupled to the cylinder for supplying, as the first gas, exhaust gas to the combustion chamber, which exhaust gas is fed thereto after passing through an external EGR pipe; and wherein the second device includes:
    an intake port coupled to the cylinder for supplying the second gas to the combustion chamber thereby to place the first gas content locally within the combustion chamber.

11. The engine as claimed in claim 3, wherein the first device includes:
    an inlet control device for controlling flow into the combustion chamber through an intake port;
    an outlet control device for controlling flow out of the combustion chamber through an exhaust port, the inlet and outlet control devices being so adjusted as to open the intake and exhaust ports during an sintake stroke of the piston to draw exhaust gas, as the first gas, into the combustion chamber.

12. The engine as claimed in claim 3, wherein the controller increases a ratio of quantity of the first gas content of the combustion chamber to total quantity of the first and second gas contents of the combustion chamber as temperature of exhaust gas drops.

13. A method of widening auto-ignition range of a lean burn internal combustion engine having at least one cylinder with a piston reciprocating therein to define a combustion chamber, comprising:
    producing stratification of exhaust gas content of the combustion chamber with air content thereof;
    carrying out a first injection of gasoline fuel for dispersion within the air content; and
    carrying out a second injection of gasoline fuel for dispersion within the exhaust gas content.

14. The method as claimed in claim 13, wherein load request on the engine determines beginning of the second injection.

15. The method as claimed in claim 13, wherein engine speed of the engine determines beginning of the second injection.

16. A computer readable storage medium having stored therein data representing instructions executable by a controller to widen auto-ignition range of a lean burn internal combustion engine, the engine having at least one cylinder, and a fuel injector for direct injection of gasoline fuel into the combustion chamber, the computer readable storage medium comprising: instructions for producing stratification of exhaust gas content of the combustion chamber with air content of the combustion chamber;
    instructions for determining a ratio of the exhaust gas content to total of the exhaust gas content and the air content;
    instructions for determining a value of cylinder pressure appropriate for the fuel injector to spray gasoline fuel for dispersion within the air content;
    instructions for estimating values of cylinder pressure at crank positions, respectively;
    instructions for carrying out a first injection of gasoline fuel by the fuel injector at a crank position having an estimated value of cylinder pressure matching the determined value of cylinder pressure; and instructions for carrying out a second injection of gasoline fuel by the fuel injector for dispersion within the exhaust gas content at around top dead center of compression stroke of the piston.

17. A system for widening auto-ignition range of a lean burn internal combustion engine having at least one cylinder with a piston reciprocating therein to define a combustion chamber, comprising:

means for supplying exhaust gas to the combustion chamber;

means for supplying air to the combustion chamber for producing stratification, within the combustion chamber, of exhaust gas content with air content; and means for carrying out a first injection of gasoline fuel into the combustion chamber for dispersion within the air content, and for carrying out a second injection of gasoline fuel into the combustion chamber for dispersion within the exhaust gas content, thereby to accomplish auto-ignition of gasoline fuel within the exhaust gas content of the combustion chamber.

* * * * *